United States Patent
Eyler et al.

(10) Patent No.: US 12,020,341 B2
(45) Date of Patent: Jun. 25, 2024

(54) IDENTIFYING MATCHED REQUESTORS AND PROVIDERS

(71) Applicant: Lyft, Inc., San Francisco, CA (US)

(72) Inventors: Ethan Duncan Eyler, San Francisco, CA (US); Taggart Matthiesen, San Francisco, CA (US); Martin Conte MacDonell, San Francisco, CA (US); Jesse Jones McMillin, San Francisco, CA (US); Sebastian Rolf Johan Brannstrom, San Francisco, CA (US); Christopher Kuh, San Francisco, CA (US); Sang Ik Lee, San Francisco, CA (US); Nicholas Robert Barrett, San Francisco, CA (US); Sean Patrick Murphy, San Francisco, CA (US); Edward Stephen Lowe, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 88 days.

(21) Appl. No.: 16/852,253

(22) Filed: Apr. 17, 2020

(65) Prior Publication Data
US 2020/0320656 A1   Oct. 8, 2020

Related U.S. Application Data

(63) Continuation of application No. 15/396,417, filed on Dec. 30, 2016, now Pat. No. 10,636,108.
(Continued)

(51) Int. Cl.
G06Q 50/40   (2024.01)
G01C 21/34   (2006.01)
(Continued)

(52) U.S. Cl.
CPC ......... *G06Q 50/40* (2024.01); *G01C 21/3438* (2013.01); *G01C 21/3697* (2013.01); *G06Q 10/02* (2013.01)

(58) Field of Classification Search
CPC .... G06Q 50/40; G06Q 10/02; G01C 21/3438; G01C 21/3697
(Continued)

(56) References Cited

U.S. PATENT DOCUMENTS

D119,041 S   2/1940   MacDonald et al.
D205,209 S   7/1966   Priddis
(Continued)

FOREIGN PATENT DOCUMENTS

CA   174696         8/2019
CN   104992509 A   10/2015
(Continued)

OTHER PUBLICATIONS

Lin, Jiyan, and Jihui Lin. "Research on the Recommendation Algorithm of Operating Vehicles' Optimum Passenger-Chosen Plots Based on ST-DBSCAN and AHP." RISTI: Revista Ibérica de Sistemas e Tecnologias de Informação E13 (2016): 404-. Print. (Year: 2016).*

(Continued)

*Primary Examiner* — Akiba K Robinson
(74) *Attorney, Agent, or Firm* — Keller Preece PLLC

(57) ABSTRACT

Embodiments provide techniques, including systems and methods, for identifying and matching requestors and providers. For example, embodiments can display an identification pattern that is unique for a matched requestor and provider to allow the providers and requestors to quickly, easily, and accurately validate one another's identities prior to a service being provided. In some embodiments, the identification element may be presented on a provider com-
(Continued)

munication device to clearly display graphics associated with an identification element to all requestors in an area so that the requestors may easily identify a matched provider.

20 Claims, 18 Drawing Sheets

Related U.S. Application Data

(60) Provisional application No. 62/402,817, filed on Sep. 30, 2016.

(51) Int. Cl.
    *G01C 21/36*      (2006.01)
    *G06Q 10/02*      (2012.01)

(58) Field of Classification Search
    USPC .............................................. 705/5, 1.1, 7.11
    See application file for complete search history.

(56) References Cited

U.S. PATENT DOCUMENTS

| | | |
|---|---|---|
| D306,042 S | 2/1990 | Evenson |
| D307,447 S | 4/1990 | Evenson |
| D319,848 S | 9/1991 | Hofman |
| D320,235 S | 9/1991 | Hofman |
| D327,506 S | 6/1992 | Bartholomai et al. |
| D374,191 S | 10/1996 | Terrebonne et al. |
| 5,918,397 A | 7/1999 | Elmer |
| D418,493 S | 1/2000 | Jobs et al. |
| 6,028,537 A * | 2/2000 | Suman ................... B60K 35/00 340/988 |
| 6,271,805 B1 | 8/2001 | Yonezawa |
| D493,454 S | 7/2004 | Andre et al. |
| 6,759,965 B1 | 7/2004 | Hatjasalo et al. |
| D508,538 S | 8/2005 | Furr |
| D521,471 S | 5/2006 | Hoehn et al. |
| D527,359 S | 8/2006 | Rashid |
| D567,876 S | 4/2008 | Au et al. |
| 7,360,248 B1 | 4/2008 | Kanevsky et al. |
| D582,394 S | 12/2008 | Hong et al. |
| D624,557 S | 9/2010 | Allen et al. |
| D642,159 S | 7/2011 | Joseph |
| D659,677 S | 5/2012 | Kim et al. |
| 8,823,508 B2 | 9/2014 | Thiruvengada et al. |
| D732,049 S | 6/2015 | Amin |
| 9,066,206 B2 | 6/2015 | Lin et al. |
| 9,070,101 B2 | 6/2015 | Abhyanker |
| D734,349 S | 7/2015 | Amin et al. |
| D738,901 S | 9/2015 | Amin |
| 9,151,614 B2 | 10/2015 | Poppen et al. |
| D743,978 S | 11/2015 | Amin |
| 9,230,292 B2 | 1/2016 | Amin et al. |
| D749,116 S | 2/2016 | Luo |
| D749,543 S | 2/2016 | Lovegrove |
| D750,110 S | 2/2016 | Amin et al. |
| D754,675 S | 4/2016 | Vazquez et al. |
| 9,327,641 B1 | 5/2016 | Bowe et al. |
| D759,032 S | 6/2016 | Amin et al. |
| 9,392,418 B2 | 7/2016 | Lubeck |
| D763,894 S | 8/2016 | Lamparelli |
| D766,302 S | 9/2016 | Phelan et al. |
| 9,442,888 B2 | 9/2016 | Stanfield et al. |
| 9,459,622 B2 | 10/2016 | Abhyanker |
| D772,454 S | 11/2016 | Ma |
| 9,494,938 B1 | 11/2016 | Kemler et al. |
| D773,941 S | 12/2016 | Holzer |
| 9,536,271 B2 | 1/2017 | Kalanick et al. |
| 9,552,564 B1 | 1/2017 | Martenis |
| 9,628,975 B1 | 4/2017 | Watkins et al. |
| 9,635,319 B1 | 4/2017 | Englander et al. |
| 9,650,007 B1 | 5/2017 | Snyder et al. |
| 9,754,338 B2 | 9/2017 | Haparnas et al. |
| 9,769,616 B1 | 9/2017 | Pao et al. |
| 9,787,951 B2 | 10/2017 | Kannon et al. |
| D803,812 S | 11/2017 | Liu et al. |
| 9,827,897 B1 | 11/2017 | Muir |
| D806,293 S | 12/2017 | Pennington |
| D812,609 S | 3/2018 | Kimbrough et al. |
| D819,068 S | 5/2018 | Scheel et al. |
| 9,965,960 B1 | 5/2018 | McDavitt-Van Fleet |
| 10,147,154 B2 | 12/2018 | Haparnas et al. |
| 10,300,876 B1 | 5/2019 | Jacob et al. |
| 10,310,505 B1 | 6/2019 | Hanson et al. |
| D854,568 S | 7/2019 | Hu |
| 10,365,783 B2 | 7/2019 | Bowden et al. |
| 10,400,975 B1 | 9/2019 | Bushre |
| D868,895 S | 12/2019 | McMillin et al. |
| D875,115 S | 2/2020 | Yan |
| D875,133 S | 2/2020 | Wang et al. |
| 10,554,783 B2 | 2/2020 | Matthiesen et al. |
| D879,804 S | 3/2020 | Corona et al. |
| D880,498 S | 4/2020 | Shahidi et al. |
| D880,499 S | 4/2020 | Fatnani et al. |
| 10,636,108 B2 | 4/2020 | Eyler et al. |
| 10,688,919 B2 | 6/2020 | Kalanick et al. |
| D896,237 S | 9/2020 | Bentley et al. |
| 10,791,536 B1 | 9/2020 | Murphy |
| D904,425 S | 12/2020 | Paul |
| D907,660 S | 1/2021 | Lee et al. |
| D912,686 S | 3/2021 | Yang |
| D915,440 S | 4/2021 | Kim et al. |
| D915,449 S | 4/2021 | Menninger |
| D916,720 S | 4/2021 | Park et al. |
| D916,764 S | 4/2021 | Kirsanov et al. |
| D917,544 S | 4/2021 | Wong |
| D931,902 S | 9/2021 | Moore et al. |
| 11,118,930 B2 | 9/2021 | Eyler et al. |
| D935,443 S | 11/2021 | Yuan |
| 11,443,398 B2 | 9/2022 | Haparnas et al. |
| D967,266 S | 10/2022 | McMillin et al. |
| 2002/0065046 A1 | 5/2002 | Mankins et al. |
| 2003/0217150 A1 | 11/2003 | Roese et al. |
| 2004/0243430 A1 | 12/2004 | Horstemeyer |
| 2005/0030224 A1 | 2/2005 | Koch |
| 2005/0100329 A1 | 5/2005 | Lao et al. |
| 2005/0109075 A1 | 5/2005 | Kithil et al. |
| 2007/0179709 A1 | 8/2007 | Doyle |
| 2008/0084360 A1 | 4/2008 | Shingai |
| 2008/0114629 A1 | 5/2008 | Pavlov |
| 2008/0195428 A1 | 8/2008 | O'Sullivan |
| 2008/0284578 A1 | 11/2008 | Mouratidis |
| 2009/0044235 A1 | 2/2009 | Davidson |
| 2009/0099732 A1 | 4/2009 | Pisz |
| 2009/0248283 A1 | 10/2009 | Bicego, Jr. |
| 2009/0319181 A1 | 12/2009 | Khosravy et al. |
| 2010/0112945 A1 | 5/2010 | Hanif |
| 2010/0283609 A1 | 11/2010 | Remer |
| 2011/0156894 A1 | 6/2011 | Lin et al. |
| 2011/0195758 A1 | 8/2011 | Damale |
| 2011/0301985 A1 | 12/2011 | Camp et al. |
| 2012/0081389 A1 | 4/2012 | Dilts |
| 2012/0137256 A1 | 5/2012 | Lalancette et al. |
| 2012/0290652 A1 | 11/2012 | Boskovic |
| 2013/0018795 A1 | 1/2013 | Kolhatkar et al. |
| 2013/0096827 A1 | 4/2013 | McCall et al. |
| 2013/0132140 A1 | 5/2013 | Amin et al. |
| 2013/0332026 A1 | 12/2013 | McKown |
| 2014/0011522 A1 | 1/2014 | Lin et al. |
| 2014/0129951 A1 | 5/2014 | Amin et al. |
| 2014/0172727 A1 | 6/2014 | Abhyanker et al. |
| 2014/0266594 A1 | 9/2014 | Reiser |
| 2015/0148989 A1 | 5/2015 | Cooper et al. |
| 2015/0161564 A1 | 6/2015 | Sweeney et al. |
| 2015/0161752 A1 | 6/2015 | Barreto et al. |
| 2015/0166009 A1 | 6/2015 | Outwater et al. |
| 2015/0199664 A1 | 7/2015 | Buckman et al. |
| 2015/0210287 A1 | 7/2015 | Penilla et al. |
| 2015/0262430 A1 | 9/2015 | Farrelly et al. |
| 2015/0271290 A1 | 9/2015 | Tao et al. |
| 2015/0289109 A1 | 10/2015 | Lubeck et al. |
| 2015/0317801 A1 | 11/2015 | Bentley et al. |

(56) References Cited

U.S. PATENT DOCUMENTS

| | | |
|---|---|---|
| 2015/0332425 A1 | 11/2015 | Kalanick et al. |
| 2015/0339923 A1 | 11/2015 | Konig |
| 2015/0348408 A1 | 12/2015 | Demisse |
| 2015/0352947 A1 | 12/2015 | Hubschman et al. |
| 2015/0356470 A1 | 12/2015 | Mitchell |
| 2016/0016526 A1 | 1/2016 | Louboutin |
| 2016/0027307 A1 | 1/2016 | Abhyanker et al. |
| 2016/0034828 A1 | 2/2016 | Sarawgi et al. |
| 2016/0034845 A1 | 2/2016 | Hiyama et al. |
| 2016/0086391 A1 | 3/2016 | Ricci |
| 2016/0093212 A1 | 3/2016 | Barfield, Jr. et al. |
| 2016/0094964 A1 | 3/2016 | Barfield, Jr. et al. |
| 2016/0117610 A1 | 4/2016 | Ikeda |
| 2016/0119260 A1 | 4/2016 | Ghafourifar et al. |
| 2016/0140649 A1 | 5/2016 | Kleve et al. |
| 2016/0292596 A1 | 10/2016 | Gaitan et al. |
| 2016/0293012 A1* | 10/2016 | Lubeck ............... H05K 999/99 |
| 2016/0321566 A1 | 11/2016 | Liu et al. |
| 2016/0321771 A1 | 11/2016 | Liu et al. |
| 2016/0334232 A1 | 11/2016 | Zhuang |
| 2016/0349067 A1 | 12/2016 | Fowe |
| 2017/0038948 A1 | 2/2017 | Cun et al. |
| 2017/0052034 A1 | 2/2017 | Magazinik |
| 2017/0053574 A1 | 2/2017 | Byrd |
| 2017/0090850 A1* | 3/2017 | Amrhein ............... G06F 3/147 |
| 2017/0115125 A1 | 4/2017 | Outwater et al. |
| 2017/0124835 A1 | 5/2017 | Boyina et al. |
| 2017/0147959 A1 | 5/2017 | Sweeney et al. |
| 2017/0178269 A1* | 6/2017 | Mckinnon ............. G06Q 50/30 |
| 2017/0193404 A1 | 7/2017 | Yoo et al. |
| 2017/0193826 A1* | 7/2017 | Marueli ........... G06Q 10/06311 |
| 2017/0270794 A1 | 9/2017 | Sweeney |
| 2017/0305332 A1 | 10/2017 | Albou et al. |
| 2017/0350719 A1 | 12/2017 | Moore et al. |
| 2018/0047091 A1 | 2/2018 | Ogden et al. |
| 2018/0060827 A1 | 3/2018 | Abbas et al. |
| 2018/0089605 A1 | 3/2018 | Poornachandran et al. |
| 2018/0096445 A1 | 4/2018 | Eyler et al. |
| 2018/0137595 A1 | 5/2018 | Kim et al. |
| 2018/0189713 A1 | 7/2018 | Matthiesen et al. |
| 2018/0191863 A1 | 7/2018 | Matthiesen et al. |
| 2018/0203591 A1 | 7/2018 | Callen et al. |
| 2018/0262891 A1 | 9/2018 | Wu et al. |
| 2019/0073738 A1 | 3/2019 | Haparnas et al. |
| 2019/0283763 A1 | 9/2019 | Wang |
| 2020/0104601 A1 | 4/2020 | Karoui et al. |
| 2020/0107226 A1 | 4/2020 | Raleigh et al. |
| 2020/0126325 A1 | 4/2020 | Jeon et al. |
| 2020/0151675 A1 | 5/2020 | McCormack |
| 2020/0228628 A1 | 7/2020 | Matthiesen et al. |
| 2021/0097315 A1 | 4/2021 | Carruthers et al. |
| 2021/0192241 A1 | 6/2021 | Zhu et al. |
| 2021/0402942 A1 | 12/2021 | Torabi et al. |
| 2022/0237277 A1 | 7/2022 | Rahman et al. |
| 2022/0238052 A1 | 7/2022 | Vitiello et al. |
| 2022/0358800 A1 | 11/2022 | Ham |

FOREIGN PATENT DOCUMENTS

| | | | |
|---|---|---|---|
| CN | 304613845 | 5/2018 | |
| EP | 2605459 A1 * | 6/2013 | ............ H04J 3/0632 |
| JP | 2003151081 A * | 5/2003 | |
| JP | 2004038672 A * | 2/2004 | |
| JP | 2004-078639 A | 3/2004 | |
| JP | 3818127 B2 * | 9/2006 | |
| JP | 3975380 B2 * | 9/2007 | |
| JP | 2016-182855 A | 10/2016 | |
| KR | 10-2010-0129531 A | 12/2010 | |
| KR | 2012-0024135 A | 3/2012 | |
| KR | 10-2015-0045962 A | 4/2015 | |
| KR | 10 1518140 B1 | 5/2015 | |
| KR | 2016-0063474 A | 6/2016 | |
| WO | WO 2008/100489 A2 | 8/2008 | |
| WO | WO 2018/064532 | 4/2018 | |
| WO | WO 2018/125827 | 7/2018 | |
| WO | WO 2018/125831 | 7/2018 | |

OTHER PUBLICATIONS

International Search Report and Written Opinion as received in PCTUS2017068283, dated Apr. 17, 2018.
International Search Report & Written Opinion as received in PCT/US2017/068295 dated Apr. 23, 2018.
Range: For Youth, apppicker.com [online], released on Apr. 10, 2014, [retrieved on Feb. 6, 2020], retrieved from the Internet <URL: https://www.apppicker.com/apps/853769848/range-for-youth> (Year: 2014).
Examiner's Report as received in Canadian application 174696 dated May 17, 2018.
Examiner's Report as received in Canadian application 174696 dated Feb. 6, 2018.
Examiner's Report as received in Canadian application 181231 dated May 17, 2018.
Examiner's Report as received in Canadian application 181231 dated Feb. 6, 2019.
First Examination Report as received in Indian patent application 293635 dated Jun. 8, 2017.
First Examination Report as received in Indian patent application 293636 dated Jun. 13, 2017.
Office Action as received in Mexican Application MX/f/2017/001364 dated Jul. 20, 2020 [No English translation available].
U.S. Appl. No. 16/424,164, Jun. 29, 2020, Office Action.
U.S. Appl. No. 29/650,461, Feb. 12, 2020, Office Action.
U.S. Appl. No. 29/650,461, May 13, 2020, Notice of Allowance.
U.S. Appl. No. 15/396,390, Mar. 7, 2019, Office Action.
U.S. Appl. No. 15/396,390, Oct. 8, 2019, Notice of Allowance.
U.S. Appl. No. 15/396,164, Mar. 22, 2019, Office Action.
U.S. Appl. No. 15/396,164, Oct. 31, 2019, Office Action.
U.S. Appl. No. 15/396,164, Apr. 22, 2020, Office Action.
U.S. Appl. No. 29/584,381, Jan. 4, 2019, Restriction Requirement.
U.S. Appl. No. 29/584,381, Apr. 12, 2019, Office Action.
U.S. Appl. No. 29/584,381, Jul. 25, 2019, Notice of Allowance.
U.S. Appl. No. 16/749,798, Oct. 7, 2020, Office Action.
U.S. Appl. No. 15/396,164, Apr. 8, 2022, Office Action.
U.S. Appl. No. 29/713,840, Apr. 5, 2022, Ex Parte Quayle Action.
U.S. Appl. No. 29/713,840, Jun. 14, 2022, Notice of Allowance.
U.S. Appl. No. 16/834,820, May 4, 2022, Office Action.
U.S. Appl. No. 17/343,419, Jun. 20, 2022, Office Action.
U.S. Appl. No. 16/424,164, Oct. 29, 2020, Office Action.
U.S. Appl. No. 29/748,123, Jan. 7, 2021, Office Action.
U.S. Appl. No. 15/396,164, Nov. 23, 2020, Office Action.
U.S. Appl. No. 16/424,164, Feb. 5, 2021, Office Action.
U.S. Appl. No. 16/749,798, Feb. 9, 2021, Notice of Allowance.
Examiner's Report as received in Canadian application 3,035,259 dated May 5, 2021.
U.S. Appl. No. 29/748,123, May 14, 2021, Office Action.
U.S. Appl. No. 15/396,164, Jul. 20, 2021, Office Action.
H. A. N. C. Bandara, A Multi-Agent System for Dynamic Ride Sharing, Dec. 28-31, 2009, Fourth International Conference on Industrial and Information Systems, ICIIS 2009 (Year: 2009).
U.S. Appl. No. 15/396,164, Sep. 22, 2022, Notice of Allowance.
U.S. Appl. No. 16/834,820, Dec. 8, 2022, Office Action.
U.S. Appl. No. 17/343,419, Nov. 8, 2022, Office Action.
U.S. Appl. No. 29/747,914, Dec. 5, 2022, Restriction Requirement.
U.S. Appl. No. 14/880,042, Jun. 23, 2016, Office Action.
U.S. Appl. No. 14/880,042, Nov. 29, 2016, Office Action.
U.S. Appl. No. 14/880,042, Apr. 19, 2017, Notice of Allowance.
U.S. Appl. No. 15/680,571, Apr. 2, 2018, Office Action.
U.S. Appl. No. 15/680,571, Aug. 14, 2018, Notice of Allowance.
U.S. Appl. No. 16/171,860, Aug. 19, 2019, Office Action.
U.S. Appl. No. 16/171,860, Nov. 19, 2019, Notice of Allowance.
U.S. Appl. No. 16/171,860, Dec. 30, 2019, Office Action.
U.S. Appl. No. 16/171,860, Jun. 30, 2020, Office Action.
U.S. Appl. No. 16/171,860, Sep. 21, 2020, Office Action.
U.S. Appl. No. 16/171,860, Jan. 12, 2021, Office Action.

(56) References Cited

OTHER PUBLICATIONS

U.S. Appl. No. 16/171,860, Feb. 11, 2022, Office Action.
U.S. Appl. No. 16/171,860, May 17, 2022, Notice of Allowance.
U.S. Appl. No. 17/822,665, Jan. 13, 2023, Office Action.
U.S. Appl. No. 16/834,820, Mar. 16, 2023, Office Action.
U.S. Appl. No. 17/343,419, Mar. 15, 2023, Notice of Allowance.
U.S. Appl. No. 29/747,914, Feb. 27, 2023, Office Action.
U.S. Appl. No. 29/747,914, Apr. 12, 2023, Notice of Allowance.
U.S. Appl. No. 16/424,164, Jun. 23, 2023, Office Action.
U.S. Appl. No. 17/822,665, May 30, 2023, Office Action.
International Search Report and Written Opinion as received in PCT/2017/054409 dated Jan. 10, 2018.
Examination Report as received in Australian Application 2017336943 dated Dec. 20, 2019.
Office Action as received in Canadian Application 3,035,259 dated Feb. 20, 2020.
U.S. Appl. No. 15/396,417, May 5, 2017, Office Action.
U.S. Appl. No. 15/396,417, Sep. 5, 2017, Office Action.
U.S. Appl. No. 15/396,417, Jun. 14, 2018, Office Action.
U.S. Appl. No. 15/396,417, Jan. 10, 2019, Office Action.
U.S. Appl. No. 15/396,417, Sep. 26, 2019, Office Action.
U.S. Appl. No. 15/396,417, Feb. 11, 2020, Notice of Allowance.
U.S. Appl. No. 16/424,164, Oct. 19, 2023, Notice of Allowance.
Notice of Allowance as received in MX application MX/a/2019/003642 dated Nov. 21, 2023.
U.S. Appl. No. 16/834,820, Sep. 14, 2023, Notice of Allowance.
U.S. Appl. No. 17/822,665, Sep. 11, 2023, Notice of Allowance.
U.S. Appl. No. 18/356,095, mailed Feb. 28, 2024, Office Action.

\* cited by examiner

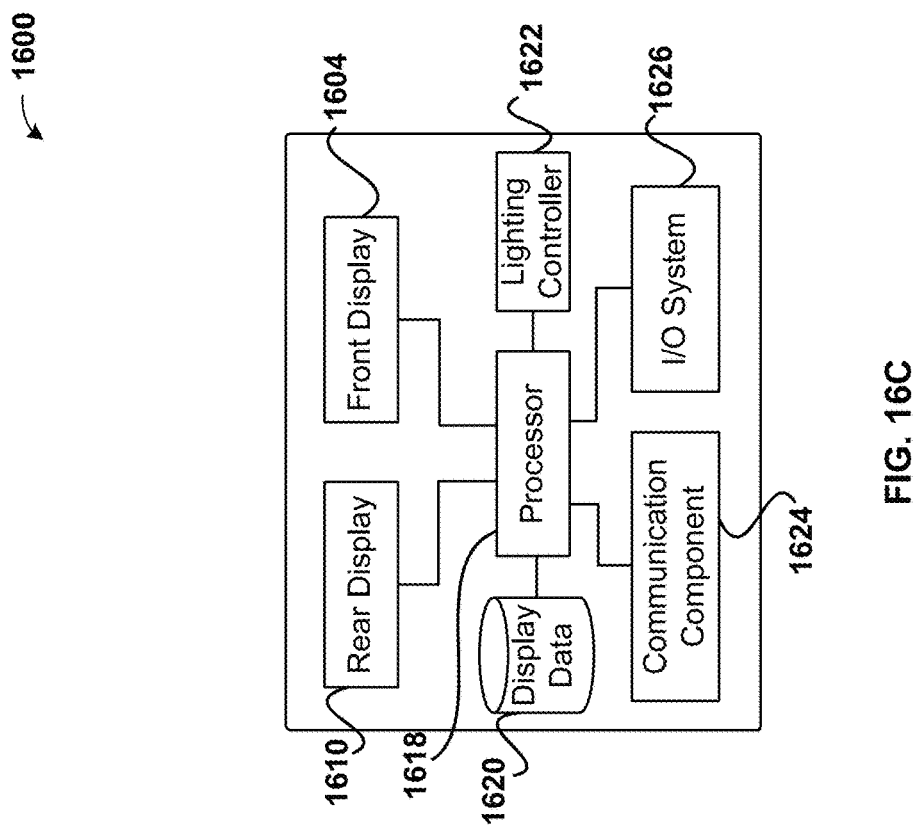
FIG. 16C
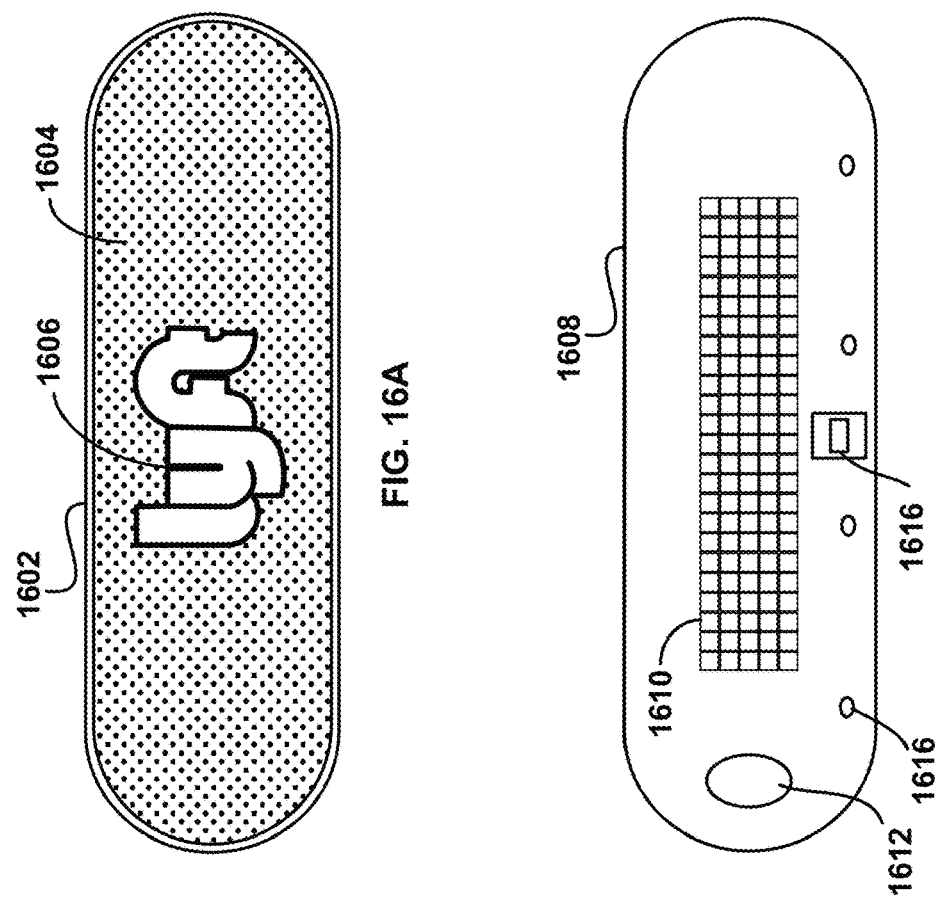
FIG. 16A
FIG. 16B

IDENTIFYING MATCHED REQUESTORS AND PROVIDERS

CROSS-REFERENCES TO RELATED APPLICATIONS

This application is a continuation of U.S. application Ser. No. 15/396,417, filed Dec. 30, 2016, which claims priority to U.S. Provisional Application No. 62/402,817 entitled "IDENTIFYING MATCHED REQUESTORS AND PROVIDERS," filed Sep. 30, 2016. Each of the aforementioned applications are hereby incorporated by reference in their entirety.

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. Additionally, on-demand service matching systems may select and provide requests to service providers based the location and status of service providers near a request location. Accordingly, on-demand matching systems may monitor system resources and control efficient resource allocation based on demand-matching between requestors and providers distributed through a geographic area. However, as the services have become more prevalent, and more users are interacting with such services, it can be difficult to identify which service provider is associated with a requestor at a request location. This leads to inefficient resource allocation as the misidentification of service providers and requestors at a request location leads to canceled and duplicated requests as well as mistaken matches between requestors and providers at a request location.

BRIEF DESCRIPTION OF THE DRAWINGS

Various embodiments in accordance with the present disclosure will be described with reference to the drawings, in which:

FIGS. 16A-16C illustrates an example provider communication device in accordance with various embodiments.

DETAILED DESCRIPTION

Figure 1:
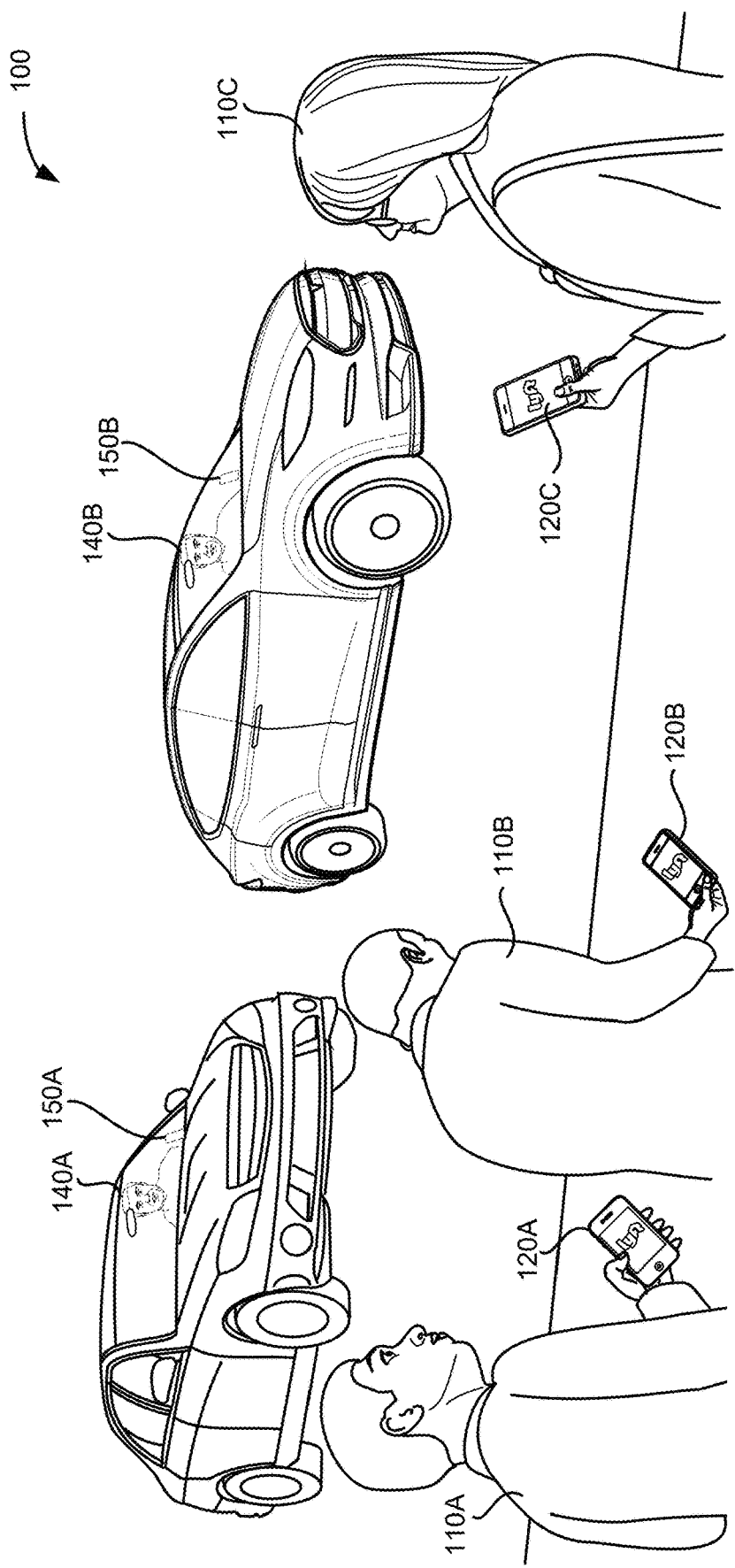
FIG. 1 illustrates an example of an environment including multiple requestors and multiple providers at a pick-up location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services that are accessed through mobile devices are becoming more prevalent. However, due to the distributed nature of unknown providers and requestors being matched by an on-demand matching system, it can be difficult for providers and requestors to identify one another at the point of service. This leads to misidentification and mismatching of providers and requestors at the point of service. For example, multiple requestors may request services in the same area and may have trouble identifying whether a service provider is associated with their request or another request. Similarly, it can be difficult for a provider to identify which of multiple requestors is associated with a request. The mismatching of providers and requestors leads to increased data processing and system communications as requestors cancel requests, place new requests, and require account corrections. Furthermore, mismatched requestors and providers also lead to fraud and safety problems as mismatched requestors may obtain goods and services without paying and the safety features of the system rely on the correct identification and matching of requestors and providers.

For example, traditionally in ride matching environments that allow drivers and riders to be matched through a mobile application on their smart phones, it can be difficult to verify a driver or rider before they are in the car. Once a rider is in the car, some drivers forget to ask for identification or are unable to communicate clearly with the rider and can mistakenly provide a ride to someone who they are not matched with. This can lead to people who did not request a ride or who matched with a different driver getting a ride somewhere they did not mean to go or getting a free ride on someone else's account. Further, the actual matched rider may cancel their ride request and request a new ride which can lead to increased system resources usage as more requests are required to fulfill the same rider demand. This can also lead to congestion in pick-up locations as drivers that matched with riders are left waiting for riders that have left in other cars. Further, once a match is made, providers are not shown other potential ride requests which can lead to unintentional shortages of drivers in certain areas, longer wait times, and lower satisfaction with the ride matching service. This can be particularly troublesome at concerts and other high traffic events where many people may desire a pick-up in the same area at around the same time. In such areas, pick-up locations can be very congested and it can be very difficult for a rider to identify which car has arrived to pick them up. Riders can get into the wrong cars and get rides that are charged to different accounts and/or may have their ride taken by a different event-goer.

Embodiments provide techniques, including systems and methods, for identifying and validating matched requestors and providers. For example, embodiments allow the use of clear and simple graphics associated with different identification elements that are unique for a matched requestor and provider near a request location to allow the providers and requestors to quickly, easily, and accurately validate one another's identities prior to a service being provided. Further, in some embodiments, graphics associated with an identification element may be presented on a provider communication device to clearly display the graphics associated with the identification element to any and all requestors in an area so that the requestors may easily identify whether they match a provider and find their matched provider. Additionally, embodiments provide efficient methods for ensuring that conflicting identification elements are not provided to multiple matched providers and requestors for a region and use real-time navigation and traffic information, among other data, to manage large numbers of requests and ensure that easily identifiable and non-conflicting graphics associated with different identification elements are presented to riders, even when in a highly congested area with many requestors requesting pick-ups in a similar area. For example, embodiments allow more combinations of identification elements to be used for heavily congested areas by using both request location and pick-up time to identify those identification elements that are already being used for a particular pick-up location. Accordingly, embodiments require fewer unique identification elements to be designed, displayed, and recognized while still allowing for unique identification of matches in congested request locations. Thus, embodiments allow for more efficient use of data processing resources and minimize the amount of required memory associated with a variety of identification elements.

Moreover, embodiments provide more consistent user interfaces for the ride matching service by limiting the necessary number of identification elements associated with the ride matching service. Additionally, by providing an efficient mechanism to authenticate and validate matched requestors and providers, embodiments minimize system communications and data processing loads due to unnecessary canceled ride requests and the issuance of new ride requests as well as the lost downtime due to stranded providers whose riders left with mismatched providers.

FIG. 1 illustrates an example of an environment 100 including multiple requestors 110A-110C and multiple providers 140A-140B at a pick-up location. Each requestor 110A-110C may have a requestor computing device 120A-120C and each provider 140A-140B may have a provider computing device 150A-150B. The requestor computing device may be used to request services (e.g., a ride or transportation, a delivery, etc.) that may be provided by the providers. The provider computing device may be used to contact available providers and match a request with an available provider. However, it may be difficult for the requestors to identify which provider is matched with their request. For example, where the requestor is asking for a ride, multiple requestors may enter the same or nearly the same pick-up locations for a ride around the same time. As such, multiple providers may arrive at a pick-up location around the same time to find multiple requestors waiting for their matched provider. It may be difficult to identify which requestor is matched with which provider. Accordingly, the wrong requestor may obtain a ride and/or may obtain goods or other services from the wrong provider.

In some cases, provider information may be sent to the requestor in order to assist requestors in identifying the correctly matched provider. For example, provider information including provider name, a picture of the provider, a type and/or make of a provider vehicle, a picture of the provider vehicle, a license plate identifier, etc., may be sent to a requestor once the request is matched with a provider. Similarly, providers may be sent request information including a requestor name, picture, demographic information, and/or other information in order to identify the matched requestor. However, the identification information may be difficult to verify in high traffic areas, busy pick-up areas, low light environments (e.g., at night or in a parking structure), and/or for those in a hurry. Provider and requestor information may require a detailed analysis to identify whether the correctly matched requestor and/or provider is obtaining the service. Further, the process of verifying the information may be perceived as suspicious or threatening and may be off-putting for both requestors and providers. Accordingly, this can be time consuming, cause delay, and negatively affect the overall interaction experience of the provider and/or the requestor.

Figure 2:
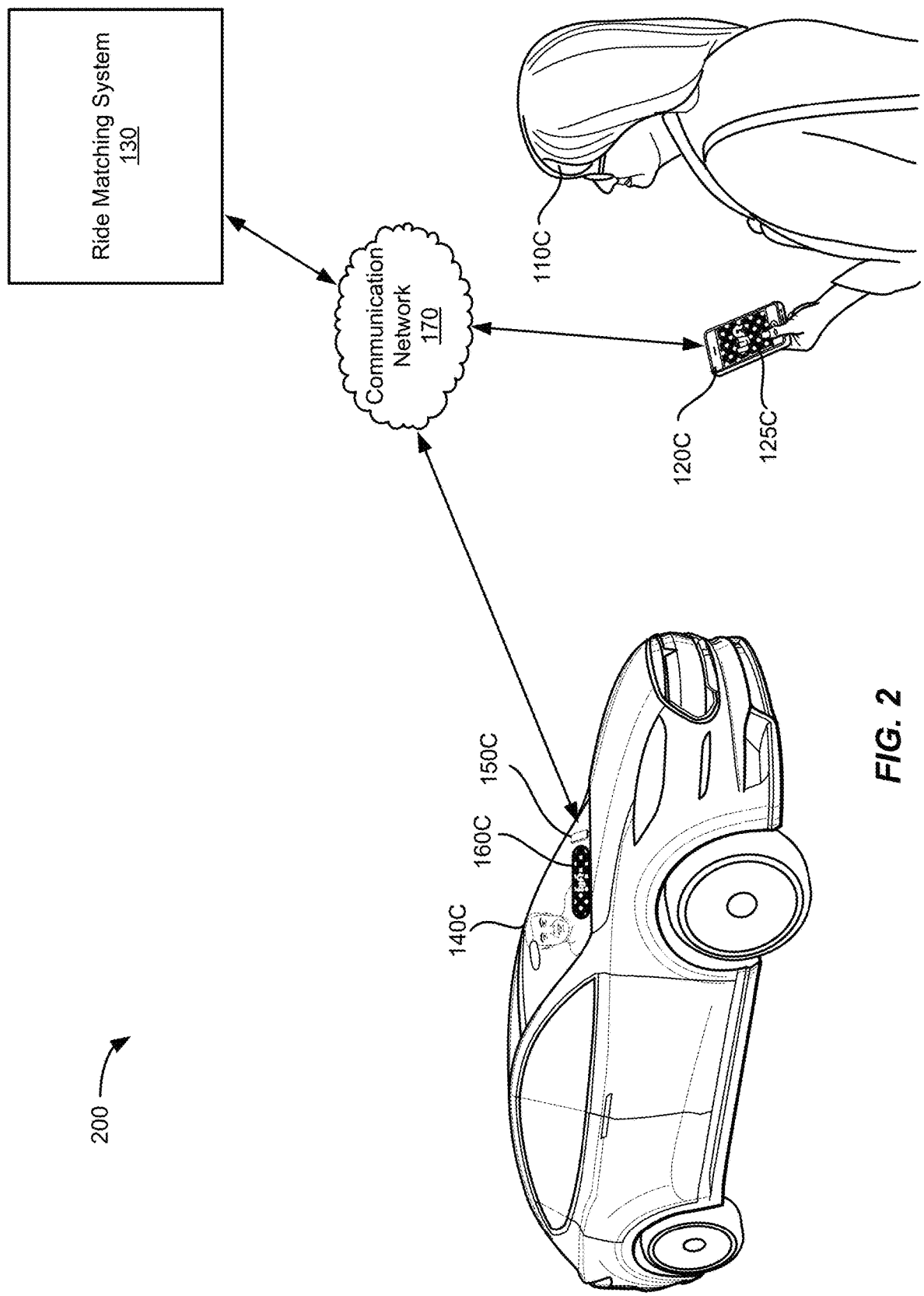
FIG. 2 illustrates an example of a ride matching system including a matched provider and requestor, in accordance with an embodiment of the present techniques.

FIG. 2 illustrates an example of a ride matching system 130 including a matched provider 140C and requestor 110C, in accordance with an embodiment of the present techniques. The ride matching system 130 may be configured to communicate with both the requestor computing device 120C and the provider computing device 150C. The provider computing device 150C may be configured to communicate with a provider communication device 160C configured to easily and efficiently display identification information to the requestor 110C. The requestor 110C may use a ride matching requestor application on a requestor computing device 120C to request a ride at a specified pick-up location. The request may be sent over a communication network 170 to the ride matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. side-streets, temperature, music preference (link to $3^{rd}$ party music provider profile, etc.), personalized pattern/color to display on provider communication device, etc.) and requestor transport restrictions (e.g., pet friendly, child seat, wheelchair accessible, etc.). Additionally, the ride request may not be based on actions of the user such that a request may be generated without the user specifically interacting with the application. For example, the requestor application may be operating in the background of the requestor computing device and may send a request based on behavior of the requestor without the requestor specifically asking for a request (e.g., based on a calendar, itinerary, and/or other behavior or information about the requestor).

The ride matching system (also referred to as a "dynamic transport matching system") 130 may identify available providers that are registered with the ride matching system 130 through an application on their provider communication device 150C. The ride matching system 130 may send the ride request to a provider communication device 150C and the provider 140C may accept the ride request through the provider communication device 150C. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the driver providing information regarding future availability (e.g., when they are going to go offline), diagnostics associated with the car (e.g., gas level, battery level, engine status, etc.), and/or any other suitable information.

The provider 140C and the requestor 110C may be matched and both parties may receive an identification element corresponding to a color, pattern, image, and/or pattern of colors to be presented on a display of the corresponding computing device. Identification elements may also include additional or other types of multimedia elements such as sounds, audio/visual presentations, holograms, augmented reality presentations, etc. Accordingly, in some embodiments, the requestor and provider may be matched using sounds, tones, and/or vibration patterns that are sent to each of the computing devices. For example, the identification element may be associated with an audio signal including any variety of sounds or tones that may be used to validate the identity and provide feedback regarding how far the provider and requestor are from one another. The patterns can be matched (e.g., matching tones or sounds between both devices) and/or the identification elements can be used to indicate proximity of the other corresponding device. For example, in some embodiments, the identification element may be used to play audio on the provider computing device and the requestor computing device where the volume, pitch, and/or rate of play of the audio on each of the provider computing device and the requestor computing device increases as the provider computing device approaches the requestor computing device. Similarly, in some embodiments, vibration or other haptic feedback may be associated with the identification element to provide proximity feedback on the corresponding devices. As such, as the devices get closer, the vibration can increase in magnitude, duration, and/or intensity to alert the user of the proximity of the corresponding party. Thus, the provider communication device 150C and the requestor computing device 120C may display the same colors, patterns, images, as well as play the same audio or vibrate in a similar manner, or provide any other identification information that can quickly and easily be identified and validated as a match. In some embodiments, the provider computing device 150C may pass the identification element to a provider communication device 160C that is configured to present the corresponding color, pattern, pattern of colors, and/or image on a large display that can easily be seen outside the provider's vehicle. The large display of the provider communication device 160C allows a requestor 110C to easily identify and match the color, pattern, pattern of colors, images, and/or other visibly identifiable information of the identification element to the corresponding identification element presented on the display 123C of the requestor computing device 120C. Similarly, the provider 140C may quickly and easily compare the identification element being displayed on the requestor computing device 120C to verify the identity of the requestor. Moreover, in some embodiments, the provider computing device may pass the identification element to one or more other displays and/or devices that may be located in a vehicle (e.g., seat displays, in-vehicle displays, user computing devices located within the vehicle, etc.) to display the graphics associated with the identification element.

Figure 3:
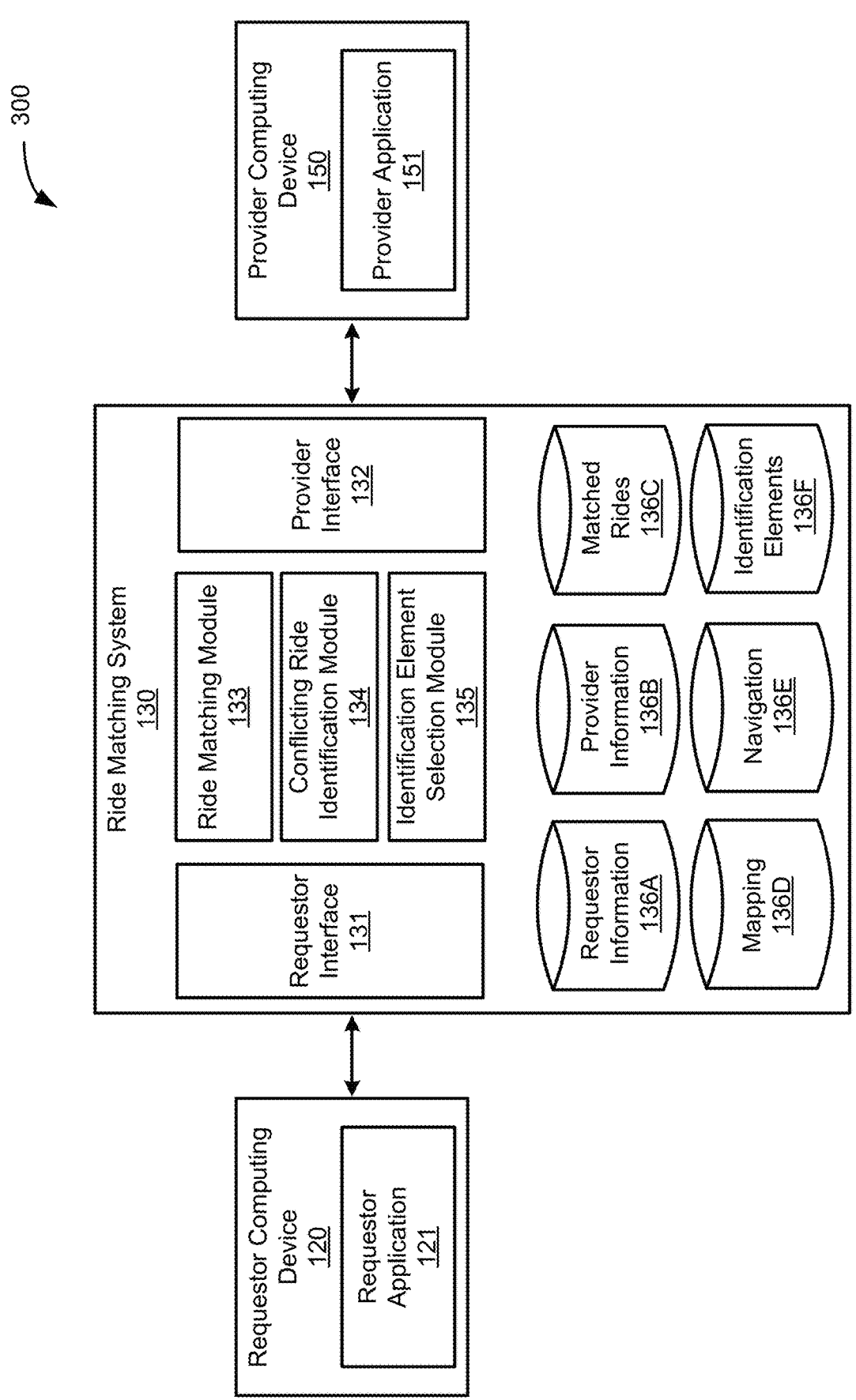
FIG. 3 illustrates an example block diagram of a ride matching system, in accordance with an embodiment of the present techniques.

FIG. 3 illustrates an example block diagram 300 of a ride matching system 130, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, a ride matching module 133, a conflicting ride identification module 134, and an identification element selection module 135. The ride matching system 130 may also include a requestor information data store 136A, a provider information data store 136B, a matched rides data store 136C, a mapping data store 136D, a navigation data store 136E, and an identification elements data store 136F which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar requests and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a ride requests data store 136C with the ride request information.

Additionally, the requestor interface 131 may be configured to send ride match messages, provider location information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor location, and/or any other relevant information.

A requestor computing device 120 may include any computing device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130. The requestor computing device 120 and the requestor application 121 will be discussed in further detail in reference to FIG. 4.

The provider interface 132 may include any software and/or hardware configured to send and receive communications and/or other information between the ride matching system 130 and a plurality of provider computing devices. The provider interface 132 may be configured to periodically receive location information, provider status information, and/or any other relevant information from the provider computing device 150 when the provider application 151 is active on the provider computing device 150. Additionally, the provider interface 132 may be configured to send ride requests, requestor location information, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider location, and/or any other relevant information.

A provider computing device 150 may include any computing device that is configured to communicate with a ride matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device 150. The provider application 151 may allow a user to accept a ride request, monitor the status of a matched ride, obtain directions or a mapped route for a matched ride, pay for a ride, monitor past rides, perform any other provider-oriented services related to the ride matching system 130, and/or obtain any other provider-oriented information from the ride matching system 130. The provider computing device 150 and the provider application 151 will be discussed in further detail in reference to FIG. 5.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region. The ride matching module 133 may provide the ride request to the provider interface 132 with the provider contact information or provider identifier so that the ride request may be sent to one or more available providers.

The ride matching module 133 may send the ride request and/or the information from the ride request to one or more of the available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider, the current location of the requestor, an estimated time of arrival for the provider, and/or any other suitable information to allow the requestor and the provider to complete the requested service. The ride matching module 133 may update the matched rides data store 136E with the corresponding matched ride information for the matched ride.

The conflicting ride identification module 134 may include a software module that is configured to determine whether two or more matched rides may have conflicting pick-ups. For example, the conflicting pick-up determination module may be configured to identify whether two or more matched rides have a same or similar pick-up location and whether the potentially conflicting matched rides have similar arrival times. For example, the ride matching module 133 may send a request to the conflicting ride identification module 134 in response to a matched ride. The conflicting ride identification module 134 may receive a pick-up location associated with a matched ride from the ride matching module 133 and may identify locations that are within a distance threshold of the pick-up location. For example, the conflicting ride identification module 134 may search a mapping data store 136D for all available pick-up locations within a distance threshold of the pick-up location. For instance, the mapping data store 136D may include a plurality of available pick-up locations for a city, region, area, neighborhood, and/or any other service area served by the ride matching system 130. The distance threshold may include any suitable metric for measuring a distance within the mapping data store 136D. For example, the distance threshold may include a distance measurement (e.g., 10 yards, 25 feet, 50 yards, etc.), a context-specific measurement (e.g., a half-block, a block, a street, etc.), or any other possible distance-based constraint. The mapping data store 136D may be organized such that pick-up locations are related by distance to one another such that the conflicting ride identification module 134 is capable of searching for all pick-up locations within a half block, 50 yards, and/or any other suitable measurement from a provided address. The pick-up locations stored within the mapping data store 136D may be based on postal maps, previously requested request locations, and/or through any other suitable method to identify those potential pick-up locations within a city or region.

Once the conflicting ride identification module 134 obtains a list of potential pick-up locations, the conflicting ride identification module 134 searches a matched ride data store 136C for any currently pending matched rides that have matching pick-up locations to the list of potential pick-up locations. The matched ride data store 136C may include ride information including a pick-up location, ride request time, requestor location, provider location, and/or any other suitable information associated with any pending matched rides through the ride matching system 130. Accordingly, the conflicting ride identification module 134 may search the currently pending matched rides for any conflicting matched rides with pick-up locations similar or the same as the current pick-up location of the matched ride.

If one or more potentially conflicting matched rides are found, the conflicting ride identification module 134 may identify whether any of the one or more potentially conflicting matched rides are likely to conflict with the pick-up of the matched ride. Accordingly, the conflicting ride identification module 134 may determine whether any of the potentially conflicting matched rides are going to arrive at the pick-up location around the same time as the matched ride. The conflicting ride identification module 134 may obtain matched ride information for the potentially conflicting matched rides and may obtain and/or generate estimated arrival times at their respective pick-up locations for each of the potentially conflicting matched rides. In some embodiments, the conflicting ride identification module 134 may obtain the provider location and the pick-up location of the potentially conflicting matched ride and map one or more routes from the provider location to the pick-up location and generate an estimated arrival time for each of the mapped routes. The conflicting ride identification module 134 may incorporate current traffic conditions, road closures, and any other relevant travel time related information to calculate an estimated arrival time for the provider. Once estimated travel times have been calculated for each of the potential routes, the conflicting ride identification module 134 may identify an estimated arrival time for the potentially conflicting matched ride. The estimated arrival time may be calculated by taking an average of the arrival time of each of the mapped routes, selecting the estimated arrival time for the fastest route, receiving a selection of one of the potential routes by the provider, identifying the route being taken based on the route being used by the provider, and/or through any other suitable method. The conflicting ride identification module 134 may perform this analysis for each of the potentially conflicting matched rides. In some embodiments, the ride matched data store 136C may already have the calculated estimated arrival time for the potentially conflicting matched ride and the conflicting ride identification module 134 may obtain the estimated arrival time for each of the potentially conflicting rides from the matched ride data store 136C.

The conflicting ride identification module 134 may also obtain an estimated arrival time for the present matched ride. The conflicting ride identification module 134 may perform a similar estimated arrival time calculation based on the provider location and the pick-up location of the presently matched ride. For example, the conflicting ride identification module 134 may map one or more routes from the location of the provider to the pick-up location of the matched ride. The conflicting ride identification module 134 may receive the provider location information and the pick-up location in the request from the ride matching module 133, by obtaining the information from the matched rides data store 136C, and/or by obtaining the information from the provider information data store 136B. The conflicting ride identification module 134 may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type of transportation (e.g., driving, biking, sailing, flying, etc.).

The conflicting ride identification module 134 may calculate an arrival time difference for each of the potentially conflicting matched rides by comparing the arrival time for the potentially conflicting matched ride to the arrival for the matched ride. For example, if an estimated arrival time for the potentially conflicting matched ride is 7:41 pm and the arrival time for the presently matched ride is 7:39, the arrival time difference is 2 minutes. The conflicting ride identification module 134 may compare the arrival time difference for each of the potentially conflicting rides to a time threshold to identify whether a time conflict exists. The time threshold may be based on average pick-up times for historically matched rides and may be geographically based such that the threshold time may be different for different cities, neighborhoods, blocks, streets, regions, areas, etc. For example, a time threshold may be 2 minutes for a residential street but may be 5 minutes for busy commercial buildings where it takes longer for requestors to find the provider and/or for areas where it is difficult for the provider to get near the pick-up location. Accordingly, because longer pick-up times open up more opportunities for providers to pick-up other requestors in the area, there is a higher chance of a conflicting driver to arrive at the pick-up location causing confusion and potential mismatching of providers and requestors. Accordingly, the conflicting ride identification module 134 may compare the arrival time difference for each of the potentially conflicting matched rides and may identify those matched rides that are likely to present a conflicting pick-up with the current matched ride.

Accordingly, the conflicting ride identification module 134 may obtain a list of conflicting matched rides and may return the list of conflicting matched rides to the ride matching module 133. If conflicting matched rides are identified, the ride matching module may send a request for an identification element to the identification element selection module 135. The identification element selection module 135 is configured to identify an available identification element based on the identified conflicting matched rides. Thus, the identification element selection module 135 allows each of the providers and requestors associated with each of the conflicting matched rides to obtain a different identification element to allow the requestors and providers to identify one another.

In some embodiments, the conflicting ride identification module 134 and the identification element selection module 135 may analyze the presence of conflicting rides and their corresponding assigned identification elements whenever a pick-up location is updated in the system. For example, the ride matching module may call the conflicting ride identification module and/or the identification element selection module 135 whenever matched ride information is updated for any matched rides within the ride matching system 130. For instance, previously matched rides may be updated to have multiple pick-up locations associated with a particular ride. As such, conflicting rides may be identified and different identification elements may be delivered for a matched ride based on updates mid-ride and/or whenever an update occurs to a matched ride. Moreover, in some embodiments, the estimated arrival time for potentially conflicting rides may be periodically tracked to ensure that traffic conditions, mistakes of a provider, inaccuracies in the mapping information, and/or any other potential issues that may delay the arrival time of a provider are monitored to identify if updated estimates show a potential conflict is real and that an identification element should be delivered for a matched ride.

Additionally, in some embodiments, where a conflicting ride is identified for a matched ride that does not have a previously assigned identification element, the identification element selection module 135 may select an identification element for the conflicting matched ride as well. For example, the identification element may only be necessary to deliver when there are multiple matched rides that could potentially conflict in the same location. As such, in some embodiments, the identification element selection module 135 may only be called and identification elements may only be sent to providers and/or requestors when a conflicting matched ride exists. Thus, for a ride that previously did not have a conflicting ride identified, both a newly matched ride and a previously matched ride may have an identification element assigned to the respective matched rides. Accordingly, the identification element selection module 135 may select an additional available identification element from the list of identification elements for the identified conflicting matched ride and return the additional available identification element to the ride matching module 133 for delivery to the provider computing device 150 and the requestor computing device 120.

The identification element selection module 135 may be configured to identify an available identification element for each matched ride within a particular geographic area. In order to ensure that there is not an overlapping and/or conflicting identification element for two matched rides at a pick-up location, the identification element selection module 135 may be configured to identify a unique and/or different identification element for each of the conflicting rides and the present matched ride. Accordingly, the identification element selection module 135 may identify whether any of the conflicting rides presently have identification elements associated with them. For example, where two or more matched rides were previously identified as having a conflict between them, the ride matching system 130 may have already identified the conflict, assigned identification elements to the conflicting matched rides, and deliver the identification elements to the conflicting rides. Where the conflicting matched rides already have assigned identification elements assigned, the identification element selection module 135 may identify those identification elements that have already been assigned to those rides and remove those identification elements from a list of available identification elements stored within an identification element data store 136F of the ride matching system 130. Accordingly, once an identification element is assigned to a matched ride, the matched ride data store 136C may be updated to include the identification element associated with the matched ride.

Thus, the identification element selection module 135 may obtain the matched ride information associated with the conflicting matched rides and identify whether any existing identification elements have been assigned to the conflicting matched rides.

The identification elements data store 136F may include a list of identification elements that have been configured for the ride matching system 130. The identification elements may be stored with constraints or rules that dictate when and/or where an identification element may be available to be deployed. For example, some identification elements may be limited to particular geographic regions, providers, requestors, times of day, etc. Further, in some embodiments, the identification elements may be ranked such that the available identification elements are presented according to an order. For example, some patterns, colors, patterns of colors, images, etc., may be preferred by users and/or may be easier to distinguish when being used and the corresponding identification elements may be ranked higher than those that are harder to distinguish and/or are not as well liked. For example, in inclement weather (e.g., rain, fog, etc.), certain colors may be utilized over other colors in order to increase visibility. For example, rather than select from a first set of colors, patterns, etc., during inclement weather, a subset of the elements may be selected and a shade, tint, or other variation of the subset of colors may be used to provide unique identification elements rather than select from the "broader" set. Additionally, certain identification elements may be selected based on data such as user data. For example, data may be received that a particular user is color-blind; therefore, only certain colors, patterns, etc. may be used from which to select identification elements. In some cases, audio may be used in place of visual elements, for example if it is determined that a user is visually impaired. The rankings may be based on past user selections, historical pick-up results (e.g., by analyzing ride history identifying the identification elements that lead to the lowest pick-up times), and/or through any other suitable method. Additionally, graphics associated with identification elements may be customized by users and/or designed by users of the ride matching system 130. Thus, different user accounts may have custom and/or preferred identification elements associated with them which may change the ranking of the identification elements for a particular user (e.g., a user's preferred identification element may be ranked above non-custom identification elements).

The identification element selection module 135 may identify an available identification element from the list of identification elements for the matched ride. The identification element selection module 135 may select the available identification element from the list of identification elements through any suitable method. For example, the identification element selection module 135 may select the identification element based on the highest ranked identification element that is not associated with the identified conflicting matched rides. Further, the identification element may be selected at random or otherwise selected from the list of identification elements that are not present in the returned conflicting identification elements. Accordingly, because the identification elements associated with the conflicting matched rides are analyzed before selecting an identification element, the identification element selection module 135 may ensure that overlapping and/or conflicting identification elements may not be sent to the same pick-up area. As such, the use of the identification elements is limited to a particular area surrounding the pick-up location and the preferred and/or highest ranked identification elements may be used at the same time by multiple matched rides system-wide without any conflicting identification elements being used in the same areas.

The identification element selection module 135 may send the selected identification element to the ride matching module 133 to deliver the selected identification element to the requestor computing device 120 and the provider computing device 150 through the requestor interface 131 and the provider interface 132, respectively.

Figure 4:
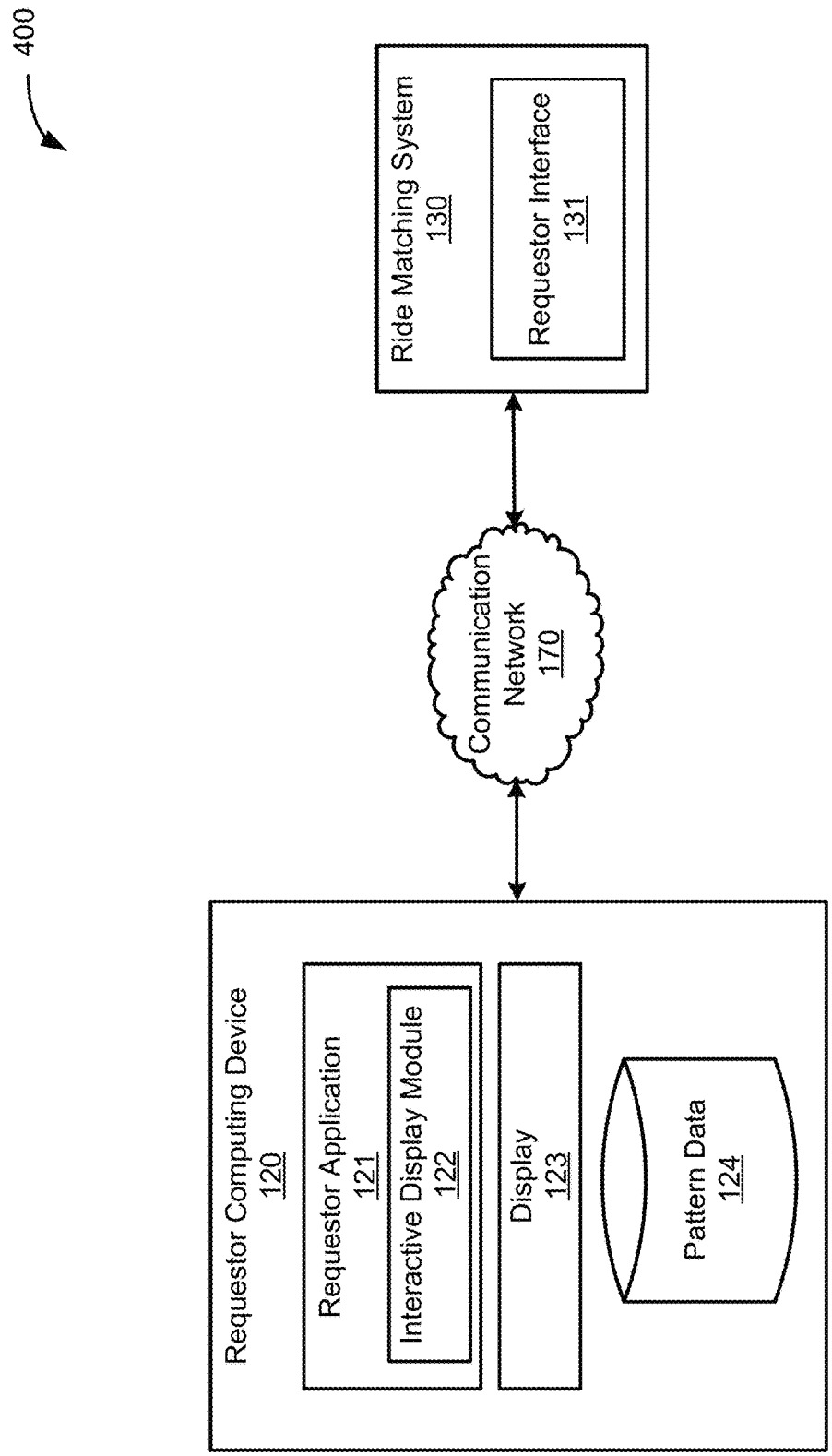
FIG. 4 illustrates an example block diagram of a requestor computing device communicating with a ride matching system, in accordance with an embodiment of the present techniques.

FIG. 4 illustrates an example block diagram 400 of a requestor computing device 120 communicating with a ride matching system 130, in accordance with an embodiment of the present techniques. As described above, the requestor computing device 120 is configured to communicate with the ride matching system 130 in order to request a service. The requestor computing device 120 may include a requestor application 121 having an interactive display module 122 with corresponding pattern data 124 and a display 123. The requestor computing device 120 may include communication components (not shown) that allow the requestor computing device 120 to communicate over one or more communication networks 170. The requestor computing device 120 may also include location identification components (not shown) to allow the requestor computing device 120 to determine its current location and/or position. For example, the location identification components may implement global positioning system (GPS), cellular communications triangulation, and/or any other suitable location-based techniques to determine the coordinates or location of the requestor computing device 120. The display 123 may include any suitable components to create visible and recognizable light. For example, the display 123 may include LED arrays, a LCD display, a projector, and/or any other components that create visible light, pixels, and/or images. Additional information regarding the computing devices may be found in reference to FIG. 17 below.

The requestor application 121 of the requestor computing device 120 is configured to receive the matched ride information including the identification element from the requestor interface 131 of the ride matching system 130. The interactive display module 122 of the requestor application 121 identifies that an identification element is present in the matched ride information. Interactive display module 122 is configured to identify and present a graphic including a pattern, a color, an image, and/or any other information that is associated with the received identification element. The interactive display module 122 may compare the identification element to a pattern data 124 stored on the requestor computing device 120 to identify the graphical representation to present on a display 123. The interactive display module 122 may be configured to identify when the provider is close to the pick-up location and may change the display 123 of the requestor computing device 120 to present the identified pattern, color, and and/or image associated with the received identification element within the pattern data store 124. An example of the presented graphic including a pattern, color, pattern of colors, and/or images associated with one exemplary identification element can be found in reference to FIG. 6D. The pattern data store 124 stores a variety of patterns, colors, pattern of colors, and/or images that are formatted for the display 123. The pattern data store may be updated as part of updating the requestor application 121 on the requestor computing device 120. Additionally updates to the pattern data may be passed as part of a match response from the ride matching system and/or through any other suitable method. Further, the pattern data may be provided directly from the ride matching system such that the graphics to display associated with an identification element is provided from the ride matching system for each matched ride. Devices having different display types, sizes, color schemes, etc., may have different pattern, color, and/or graphic data stored within the pattern data store 124. The interactive display module 122 may identify when a provider is nearby through any suitable manner, for example, the requestor application 121 may periodically receive a provider location and/or may receive an estimated arrival time of the provider from the ride matching system 130. The interactive display module 122 may display the graphics including the pattern, color, and/or image associated with the identification element a predetermined time period ahead of the estimated arrival time or when the provider location is within a predetermined distance from the requestor location and/or pick-up location. Further, the requestor application 121 may receive a notification when the provider has arrived and the interactive display module 122 may activate the associated identification element presentation when the arrival indication is received.

Figure 5:
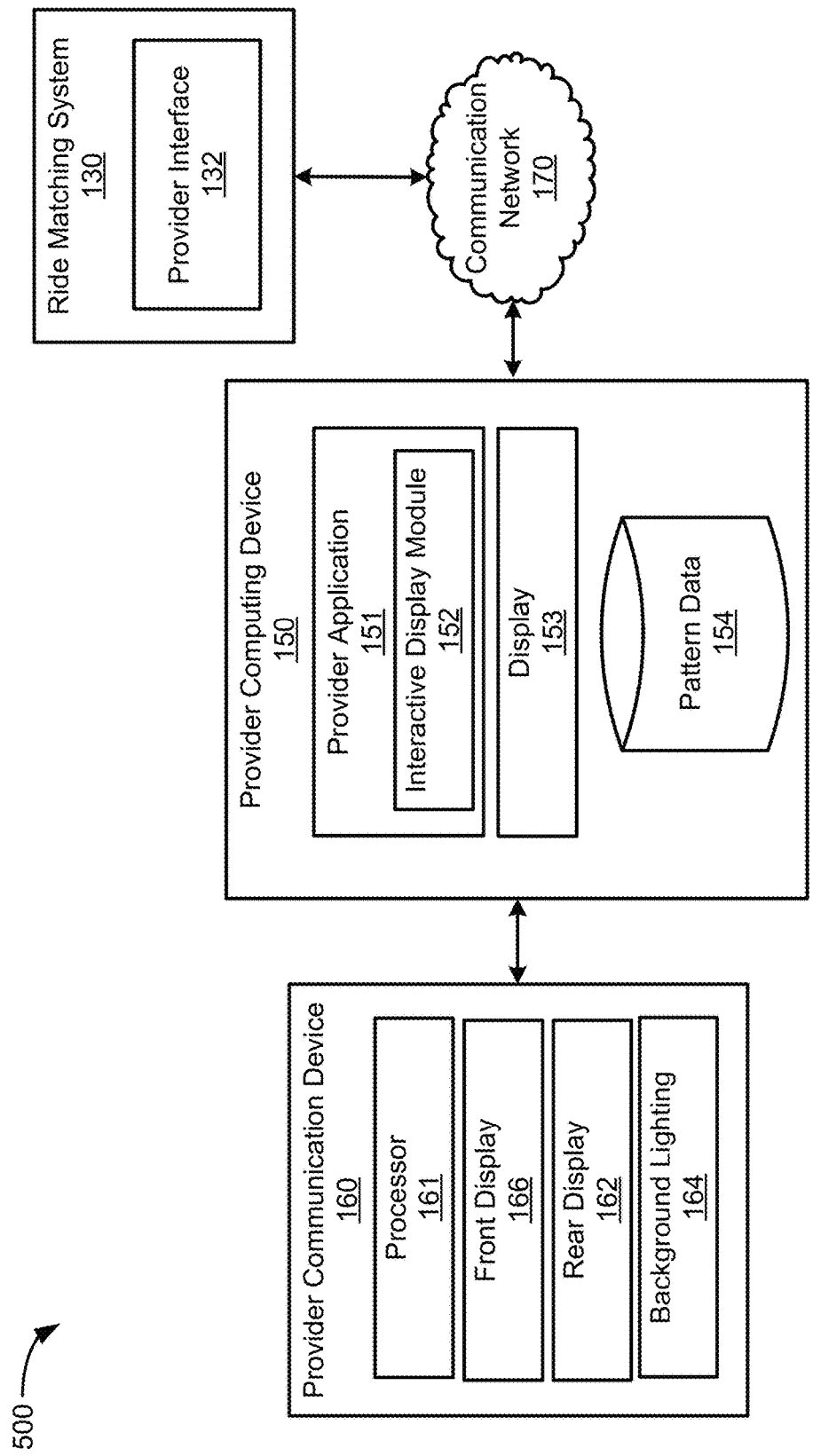
FIG. 5 illustrates an example block diagram of a provider computing device communicating with a ride matching system and a provider communication device, in accordance with an embodiment of the present techniques.

FIG. 5 illustrates an example block diagram 500 of a provider computing device 150 communicating with a ride matching system 130 and a provider communication device 160, in accordance with an embodiment of the present techniques. As described above, the provider computing device 150 is configured to communicate with the ride matching system 130 to receive and provide a response to a request to provide a service. The provider computing device 150 may communicate with the ride matching system 130 through one or more communication networks 170. The provider computing device 150 may communicate with the provider communication device 160 through a wired or wireless connection. For example, the devices may be paired using Bluetooth™ or another short range communication protocol.

including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the ride matching system 130 may dynamically match requestors and providers that are distributed throughout a geographic area.

The provider application 151 of the provider computing device 150 is configured to receive the matched ride information including the identification element from the provider interface 132 of the ride matching system 130. The interactive display module 152 of the provider application 151 may identify that an identification element is present in the matched ride information. The interactive display module 152 is configured to identify and present a graphic including a pattern, a color, an image, and/or any other information that is associated with the received identification element on a display 153 of the provider computing device 150 as well as on one or more displays 162-164 of the provider communication device 160. The interactive display module 152 may compare the identification element to a pattern database 154 stored on the requestor computing device 120 to identify the graphical representation to present on the displays. Additionally, the interactive display module 152 is configured to send the identified graphic including the pattern, image, and/or colors associated with the identification element to the provider communication device 160 for presentation by the provider communication device 160.

The provider communication device 160 is configured to display the corresponding graphic including patterns, colors, and/or images on a front display 162, rear display 163, and/or background lighting 164 of the provider communication device 160. The provider communication device 160 may include a processor 161, a front display 162, a rear display 163, and background lighting 164. The processor 161 may be configured to receive instructions related to displaying graphics and/or other information associated with the provider application 151 from the provider computing device 150 and present those graphics on one or more of the front display 162, rear display 163, and/or background lighting 164. The processor 161 may be configured to control each of the displays independently and/or as a group.

The interactive display module 152 may be configured to identify when the provider is close to the pick-up location and may change the display of the provider computing device 150 and the provider communication device 160 to present the identified graphics including pattern, color, and/or images associated with the received identification element within the pattern data store 154. The interactive display module 152 may provide the identification element and/or the corresponding graphical information to display the patterns, colors, and/or images associated with the identification element on the provider communication device 160 upon determination that the provider is near the pick-up location. An example of the presented graphics including patterns, colors, and/or images associated with a variety of different exemplary identification elements on a provider communication device 160 can be found in reference to FIGS. 6A, 7A-7B, and 8A-8B. Graphics may also comprise multimedia elements such as sounds, videos, or any type of audio and/or visual presentation.

The pattern data store 154 stores a variety of patterns, colors, and/or images that are formatted for the display and devices having different display types, sizes, color schemes, etc. may have different pattern, color, and/or image data stored within the pattern data store 154. Additionally, as described above in reference to the requestor computing device of FIG. 4, the pattern data store may be updated as part of updating the provider application 151 on the provider computing device 150. Additionally, updates to the pattern data 154 may be passed as part of a match response from the ride matching system 130 and/or through any other suitable method. Further, the pattern data 154 may be provided directly from the ride matching system 130 such that the graphics to display associated with an identification element is provided from the ride matching system for each matched ride. The interactive display module 152 may identify when a provider is nearby through any suitable manner, for example, the requestor application 121 may periodically receive a provider location and/or may receive an estimated arrival time of the provider from the ride matching system 130. The interactive display module 152 may display the pattern, color, and/or image associated with the identification element a predetermined time period ahead of the estimated arrival time or when the provider location is within a predetermined distance from the requestor location and/or pick-up location. Further, the requestor application 121 may receive a notification when the provider has arrived and the interactive display module 152 may activate the associated identification element presentation when the arrival indication is received from the ride matching system 130. In some embodiments, an interactive display module 152 and the pattern data 154 may be present on the provider communication device 160 as well and the provider communication device 160 may be configured to identify which information (e.g., patterns, colors, and/or images) associated with the identification element should be presented based on the received identification element from the provider computing device 150.

Figure 6A:
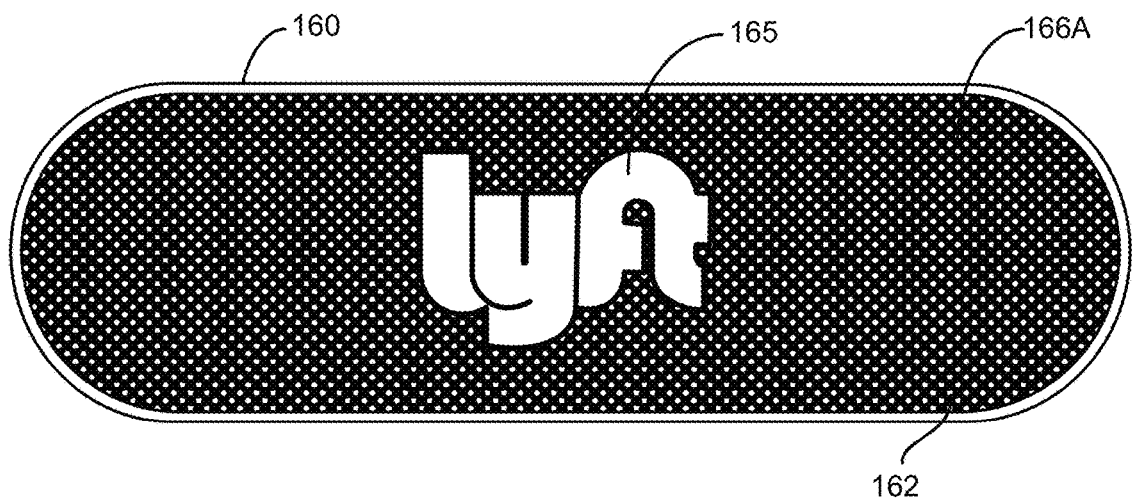
FIGS. 6A-6C illustrate different viewpoints of an exemplary provider communication device, in accordance with an embodiment of the present techniques.
Figure 6B:
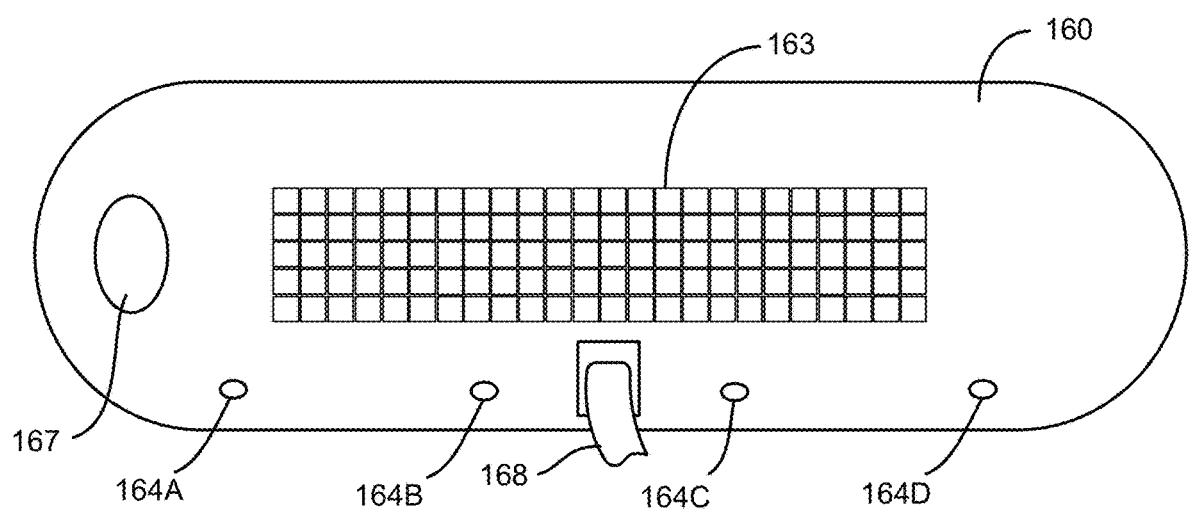
Figure 6C:
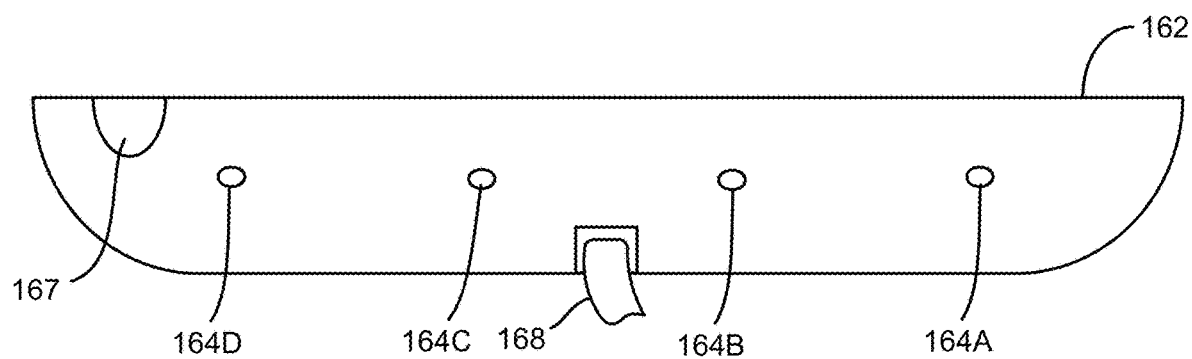

FIGS. 6A-6C illustrate different viewpoints of an exemplary provider communication device 160, according to some embodiments of the present techniques. FIG. 6A shows a front view of the provider communication device 160 having a front display 162 and a logo 165 display. In some embodiments, the logo may have different corresponding lights and/or display elements associated with it such that it can display different colors and/or patterns than the front display. In some embodiments, the logo may have a stable color such that it may not change over time. In some embodiments, the front display may comprise a large number of light sources that can be configured to display a wide range of patterns, colors, images, and/or any other information on the front display of provider communication device 160. For example, the front display may have an array of light emitting diodes (LEDs) that may be configured to provide any number of colors either individually or in combination with the other LEDs in the array. Any suitable lighting sources may be used in the front display. FIG. 6A shows the provider communication device 160 presenting a first pattern 166A on the front display 162 that has a single color being displayed through the display portion of the front display with a lighter colored logo 165 to offset the darker background.

FIG. 6B shows a rear view of the provider communication device 160 having a rear body, a rear display 163, a power button 167, background lighting 164A-164D, and a device input 168. The rear display is configured to display instructions, greetings, directions, the identification element, and/or any other suitable information to those in a vehicle and/or behind the vehicle. For example, the rear display may be configured to instruct a provider with navigation directions to a requestor, may show a greeting to the requestor as they enter the vehicle, may display a matching identification element to help the provider and/or requestor that arrives in the vehicle or is behind the vehicle identify the correct matching provider and/or any other suitable purpose for displaying information to the provider and/or requestor. The rear display may include an array of LEDs and/or any other suitable lighting source that may be capable of displaying multiple colors, patterns, graphics, images, animation, and/or any other perceivable information to a requestor and/or driver. The background lighting 164A-D may include one or more independent light sources that are pointed in a downward direction to allow a cloud of light to fill the dashboard and/or front driving area of the vehicle. The background lighting 164A-D may be separate and distinct colors and/or patterns from the front and rear display and/or may match the pattern and/or colors displayed on the front and/or rear display.

The power button 167 may allow a provider to quickly and easily turn the provider communication device 160 on or off and may have a sleep mode and/or other settings interface for the driver to interact with the provider communication device 160. The device input 168 may include any suitable power input 168 and/or data input 168 to allow one or more other devices and a power supply to be provided to the provider communication device 160. The provider communication device 160 may receive power from an independent battery and/or from a power supply of the vehicle. The data input 168 may allow the provider computing device 150 to send information to the provider communication device 160 and/or the provider communication device 160 may include a wireless communication element that allows the provider computing device 150 to communicate with the provider communication device 160. For example, Bluetooth™ and/or other short range communication protocols may be used to link and/or pair the provider communication device 160 and the provider computing device 150.

FIG. 6C shows a bottom view of the provider communication device 160 showing the background lighting 164A-D, power button 167, and the device input 168. Each of the light sources for the background lighting 164A-D may have separate colors and/or controllers such that each of the independent lights of the background lighting 164A-D may be activated, deactivated, and/or have different colors showing at any given time. For example, if directions are being provided to the driver to take a right turn, the background lighting 164A-D may display a color with a pattern that lights the individual background lighting 164A-D from left to right in a repeating pattern to indicate to the driver that a right turn should be taken. Accordingly, the pattern may begin with the left-most background lighting element 164A display for a half second, followed by the immediately adjacent background light to the right 164B being lit for a half second, and so on until each of the background lights 164A-D are activated and deactivated from left to right to indicate to the driver that a right turn should be made.

Figure 6D:
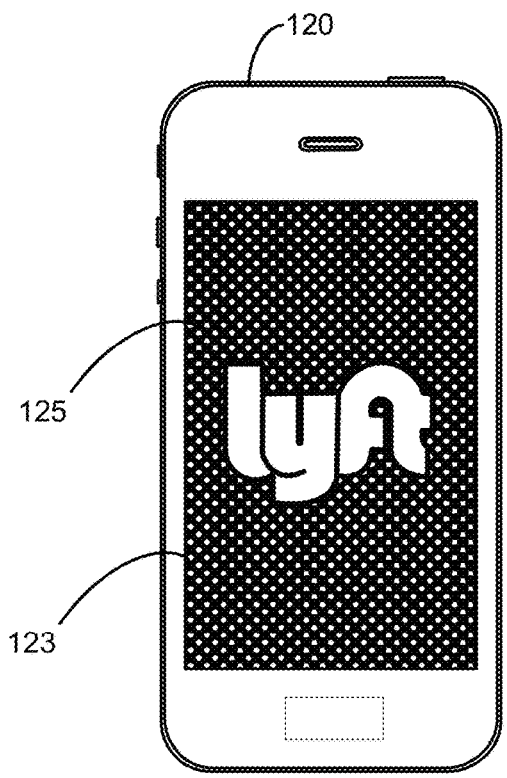
FIG. 6D illustrates an exemplary computing device, in accordance with an embodiment of the present techniques.

FIG. 6D illustrates an exemplary computing device, in accordance with an embodiment of the present techniques. The computing device may be a requestor computing device 120 and/or a provider computing device 150. The computing device includes a display 123 with a pattern 125 associated with an identification element being presented on the display 123. The pattern 125 matches the pattern 165 being displayed on the provider communication device 160. In some embodiments, the pattern 125 may be displayed on the requestor computing device 120 and the provider computing device 150 and may match the pattern 166 being displayed on the provider communication device 160 all at the same time so that each party may identify the correctly matched provider and requestor.

Figure 7A:
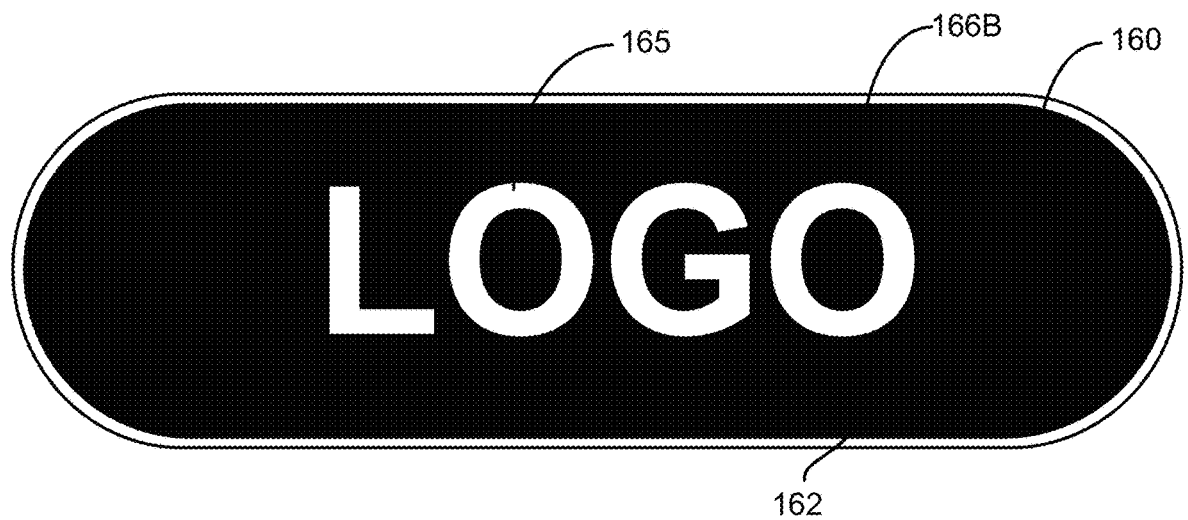
FIGS. 7A and 7B illustrate an exemplary provider communication device showing different colors designs on a front display of the provider communication device, in accordance with an embodiment of the present techniques.
Figure 7B:
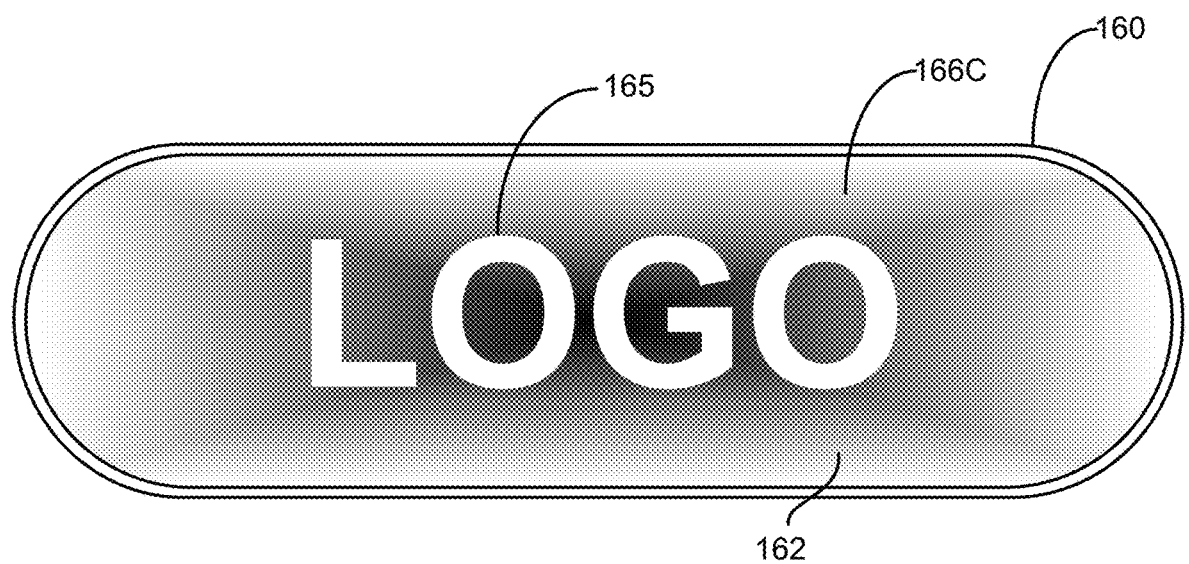

FIGS. 7A and 7B illustrate an exemplary provider communication device 160 showing different colors designs on a front display of the provider communication device 160, in accordance with an embodiment of the present techniques. For example, FIG. 7A shows a provider communication device 160 having a solid dark color pattern 166B displayed with a light colored logo 165 on the front display 162. FIG. 7B shows a provider communication device 160 having a lighter colored background with multiple colors being displayed that are darker in the middle of the display and get lighter towards the edges of the provider communication device 160. Again the logo is displayed in a lighter color. The pattern may change and the lighter and darker colors of the front display may change over time to present a color wave animation that emanates out from the darker center of the front display to the lighter edges of the front display.

Figure 8A:
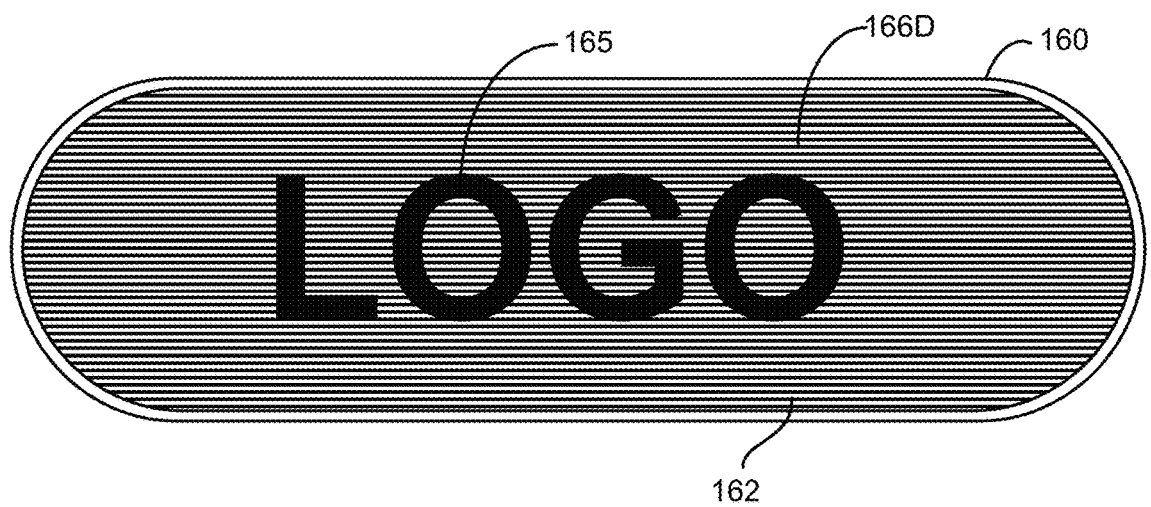
FIGS. 8A and 8B illustrate an exemplary provider communication device showing different pattern on a front display of the provider communication device, in accordance with an embodiment of the present techniques.
Figure 8B:
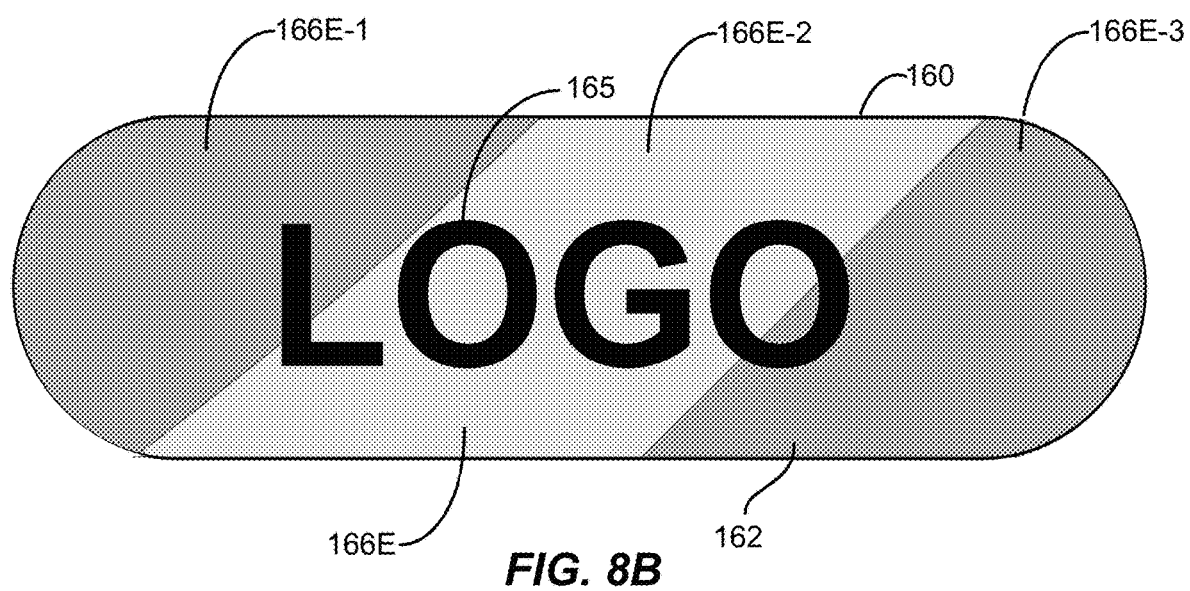

FIGS. 8A and 8B illustrate an exemplary provider communication device 160 showing different patterns on a front display of the provider communication device 160, in accordance with an embodiment of the present techniques. FIG. 8A shows a horizontal pattern of two different colors (one light and one dark) and may be generated by the light sources within the front display and/or through a horizontal display structure of the front display. For example, light color emitting LEDs may display a light color behind a front display cover of tight horizontal lines to create the pattern displayed in FIG. 8A. In other embodiments, a LCD display may generate the pattern by using a mixture of light and dark pixels on the front display. Either way, the pattern associated with an identification element may be displayed on the front display. The logo of FIG. 8A may have a darker color and may have a separate light source from the front display and/or may not have a light source and may be identified through a separate darker physical substrate (e.g., black plastic, etc.). Additional patterns may include polka-dot patterns, stripes of different color regions, horizontal lines, vertical lines, and/or any other suitable combinations of light that may be distinguished by a requestor and/or provider. The patterns may be generated through combinations of physical elements (a lightly colored front display cover with dots) and background lighting (the dark color emanating from the dots) or through a combination of dark and light pixels on a single display (e.g., LCD display). Patterns may also be projected onto a surface and/or may be provided through an augmented reality (AR) view provided through the computing devices.

FIG. 8B shows another example of a pattern 166E on the front display 162 of the provider communication device 160 that includes multiple color regions 166E-1/166E-3. The color regions 166E-1/166E-3 may be stationary or may move horizontally or vertically across the front display 162 of the provider communication device 160. In some embodiments, the color regions 166E-1/166E-3 may be used to provide a pattern of different colors (e.g., red, green, red). Additionally, the color regions 166E-1/166E-3 may move to indicate directions and/or instructions for a provider and/or requestor to follow to find the location of the corresponding requestor and/or provider. For example, if the provider computing device 150 is located to the right of the requestor computing device 120, the pattern 166E may move from the left to the right to indicate in which direction the requestor should move to find the provider computing device 150 (and vice versa). The patterns shown herein are merely examples of some patterns that can be generated and displayed in some embodiments and the patterns are not limited to those shown. For example, in some embodiments, patterns may include stripes, dark horizontal lines of different color, different shapes of the front display, icons, brands, graphics, animations, etc. may all be shown as patterns displayed through the front display and matched by the requestor computing device 120 and/or provider computing device 150.

Figure 9:
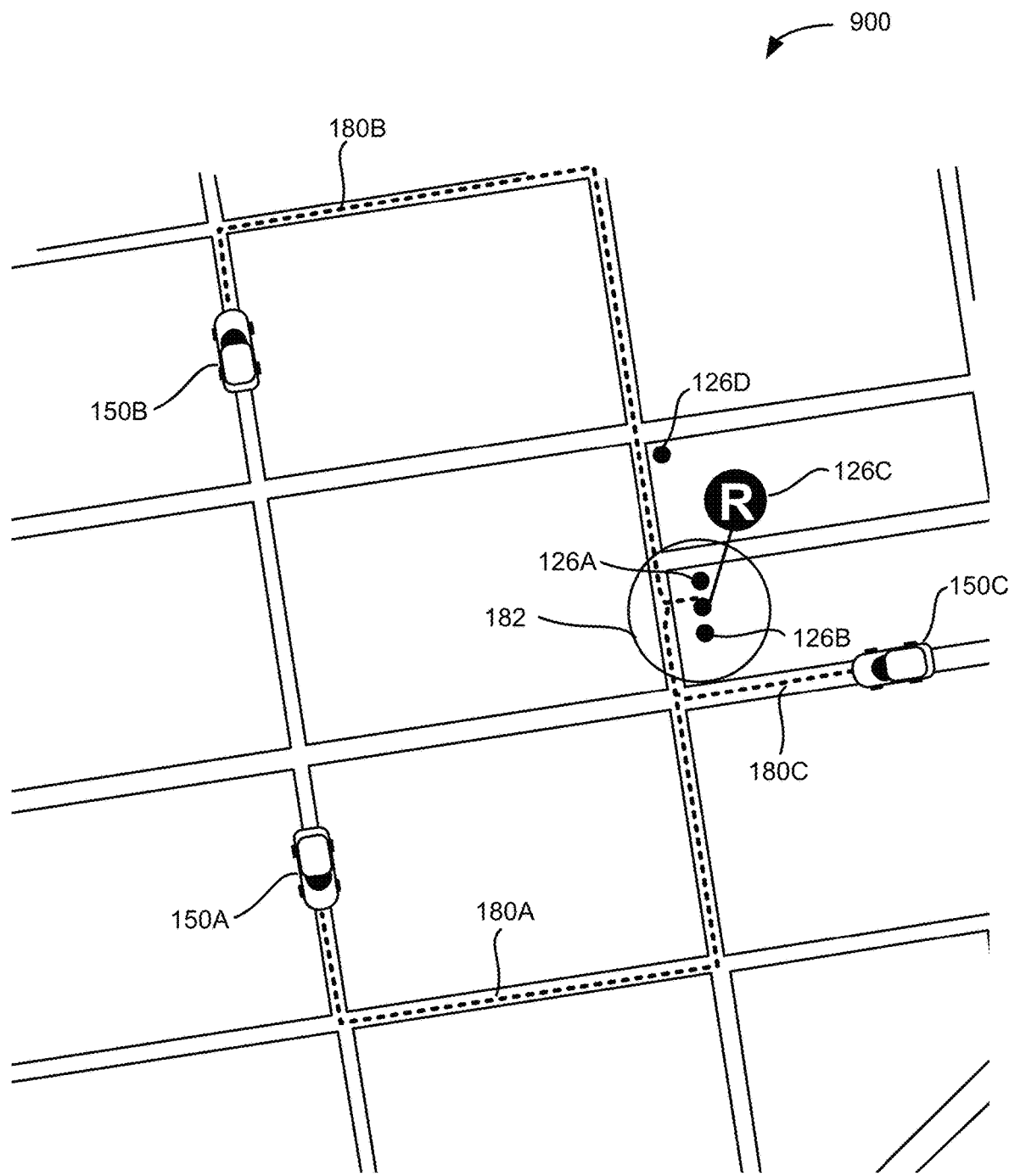
FIG. 9 illustrates a diagram of multiple matched providers having pick-up locations that are within a distance threshold of a requestor pick-up location, in accordance with an embodiment of the present techniques.

FIG. 9 illustrates a diagram 900 of multiple providers and requestors that have matched rides with pick-up locations that are within a distance threshold of a requestor pick-up location, in accordance with an embodiment of the present techniques. As discussed previously, in some embodiments, identification elements may only be provided to providers and requestors when multiple match rides are going to conflict in a particular area. As such, some embodiments may identify whether multiple matched rides are associated with a pick-up location before issuing identification elements and/or determining which identification elements are available to be assigned to a particular matched ride. As such, FIG. 9 shows an example where two other providers are associated with pick-up locations for two other requestors within a distance threshold of a pick-up location of a requestor.

In the example shown in FIG. 9, the ride matching system 130 may receive a ride request from a requestor computing device 120C that includes a requestor location for a pick-up. The ride matching system 130 may identify a provider computing device 150C associated with an available provider in the area, send the ride request to the provider computing device 150C and receive a ride match response from the provider computing device 150C that accepts the ride. The ride matching system 130 may identify a location of the provider computing device 150C and map a navigation route 180C from the location of the provider computing device 150C to the pick-up location 120C.

The ride matching system 130 may determine a provider estimated arrival time based on the navigation route and may store that information associated with the matched ride information. The provider estimated arrival time is the estimated arrival time of the provider to arrive at the request location from the current location of the provider computing device. The ride matching system 130 may calculate an estimated arrival time using the distance of the mapped navigation route, road conditions for the mapped navigation route, current and/or historical traffic information for the mapped navigation route, current and/or historical travel time information for the mapped navigation route, weather information, vehicle diagnostic information (e.g., gas level, service light on, flat tire, etc.), and/or any other suitable information. For example, the ride matching system 130 may determine that with traffic the estimated arrival time for the provider computing device 150C to the pick-up location 126C may be 4 minutes.

The ride matching system 130 may determine a plurality of locations within a distance threshold 182 of the request location and search a matched rides data store 136C including a plurality of matched rides for a matched ride associated with any of the plurality of locations. For example, the distance threshold may be fifty yards, half a block, or any other suitable distance threshold associated with the pick-up location where a requestor may be confused by another provider approaching (and vice versa). In FIG. 9, the ride matching system 130 may identify two other matched rides 180A and 180B that could potentially conflict with the present matched ride since those two rides have pick-up locations (e.g., 126A and 126B) within the block that the requestor is being picked up. Note that the fourth pick-up location 126D will not be indicated as a potentially conflicting matched ride because the address and/or location information associated with the fourth pick-up location 126D is outside the distance threshold of the present matched ride pick-up location 126C.

The ride matching system 130 may identify an estimated arrival time for both of the potentially conflicting matched rides (but not the fourth pick-up location 126D) and identify whether either of those rides will conflict with the pick-up location 126C of the third requestor computing device 120C. For example, the ride matching system 130 may determine that the provider associated with the first matched ride will arrive in 5 minutes and the provider associated with the second matched ride will arrive in 6 minutes. The ride matching system 130 may calculate the estimated arrival time for each of the previously matched rides using map routing, traffic data, etc. as described above, or may obtain a previously calculated estimated arrival time for each of the rides from the matched ride information for each of the matched rides.

The ride matching system 130 may compare each of the estimated arrival times for the previously matched ride to the present matched ride estimated arrival time to identify an arrival time difference. For example, the arrival time differences for the two previously matched rides may be 1 minute and 2 minutes, respectively. The ride matching system 130 may compare the arrival time differences to a time threshold to identify whether a time conflict exists for the two potentially conflicting previously matched rides. The time threshold may be identified through any suitable method. For example, the time threshold may be an average pick-up time, a maximum pick-up time, a consistent preset time for all areas, etc. The time threshold may also be based on the pick-up location. For instance, the time threshold may be identified by an average pick-up time for the city, neighborhood, or region associated with the pick-up location. For the example shown in FIG. 9, the ride matching system 130 may identify that the average pick-up time for the area of the pick-up location is two minutes and thirty seconds. Accordingly, the ride matching system 130 may determine that both rides are conflicting because they both fall within the two minute thirty second arrival time threshold and thus could potentially conflict with the arrival of the provider to the pick-up location.

The ride matching system 130 may identify the identification elements associated with the conflicting matched rides to determine which identification elements are still available for the location and time. For example, the ride matching system 130 may determine that the first conflicting matched ride 180A already has identification element "002" that corresponds to a pattern of white and black striped colors associated with the first matched ride. Similarly, the ride matching system 130 may determine that the second conflicting matched ride 180B has identification element "004" that corresponds to a light colored background pattern with a dark logo associated with the second matched ride 180B. Accordingly, the matched ride system may determine that these two identification elements are not available for the third matched ride 180C. The ride matching system 130 may identify a plurality of available identification elements that do not include the two used identification elements (e.g., "002" and "004") and may select one of the identification elements from the plurality of available identification elements. For example, in some embodiments, the ride matching system 130 may obtain a list of ranked identification elements, remove the conflicting identification elements, and select the highest ranked identification element that remains available for the third matched ride. Thus, the system may have a preferred order of identification elements that are the easiest to identify for providers and/or requestors and use those identification elements first. Further, the ranking may be based on personalized preferences of the provider and/or the requestor, the region and/or geographic area, and/or through any other ranking criteria to identify the preferred rankings of identification elements. Alternatively and/or additionally, in some embodiments, the ride matching system 130 may obtain a list of unranked identification elements, may remove the previously assigned identification elements, and may select a remaining identification element at random. Either way, the ride matching system 130 may identify and select an identification element from available identification elements for a geographic region and a time to ensure that the identification element is unique for the requestor and provider at a particular location. As such, in the example of FIG. 9, the ride matching system 130 may identify that identification element "001" that corresponds to a polka dot pattern is available and may assign the identification element "001" to the third matched ride 180C.

Once the identification element has been assigned to the third matched ride, the ride matching system 130 may update the matched ride data store 136C with the assigned identification element and may send a provider ride match response to the provider computing device that includes the assigned identification element. Similarly, the ride matching system 130 may send a requestor ride match response to the requestor computing device 120C that includes the assigned identification element. Accordingly, both the requestor computing device 120C and the provider computing device 150C have the same identification element "001" for the matched ride.

Note that the conflicting ride analysis may be performed at any point and does not have to reference a particular matched ride. For example, in some embodiments, the potentially conflicting rides may be identified when a ride request is received, after a matched ride response has been delivered for the matched ride, periodically without a particular action related to a ride, and/or at any other suitable time. For instance, the system may periodically analyze pick-up locations and corresponding estimated arrival times within a database of matched ride information to identify conflicting rides.

Additionally, in some embodiments, the ride matching system 130 may identify that a previously matched ride that was not issued an identification element may conflict with a newly matched ride. Accordingly, in some embodiments, the ride matching system 130 may assign an identification element to a presently matched ride once the system identifies a conflicting matched ride and then update the previously matched ride to assign an identification element to that ride. Further, in some embodiments, identification elements may be provided for every ride, whether there is a conflicting ride or not, and only when a conflicting ride is identified is a different identification element (based on ranking, personal preference, etc.) assigned to a matched ride.

Figure 10:
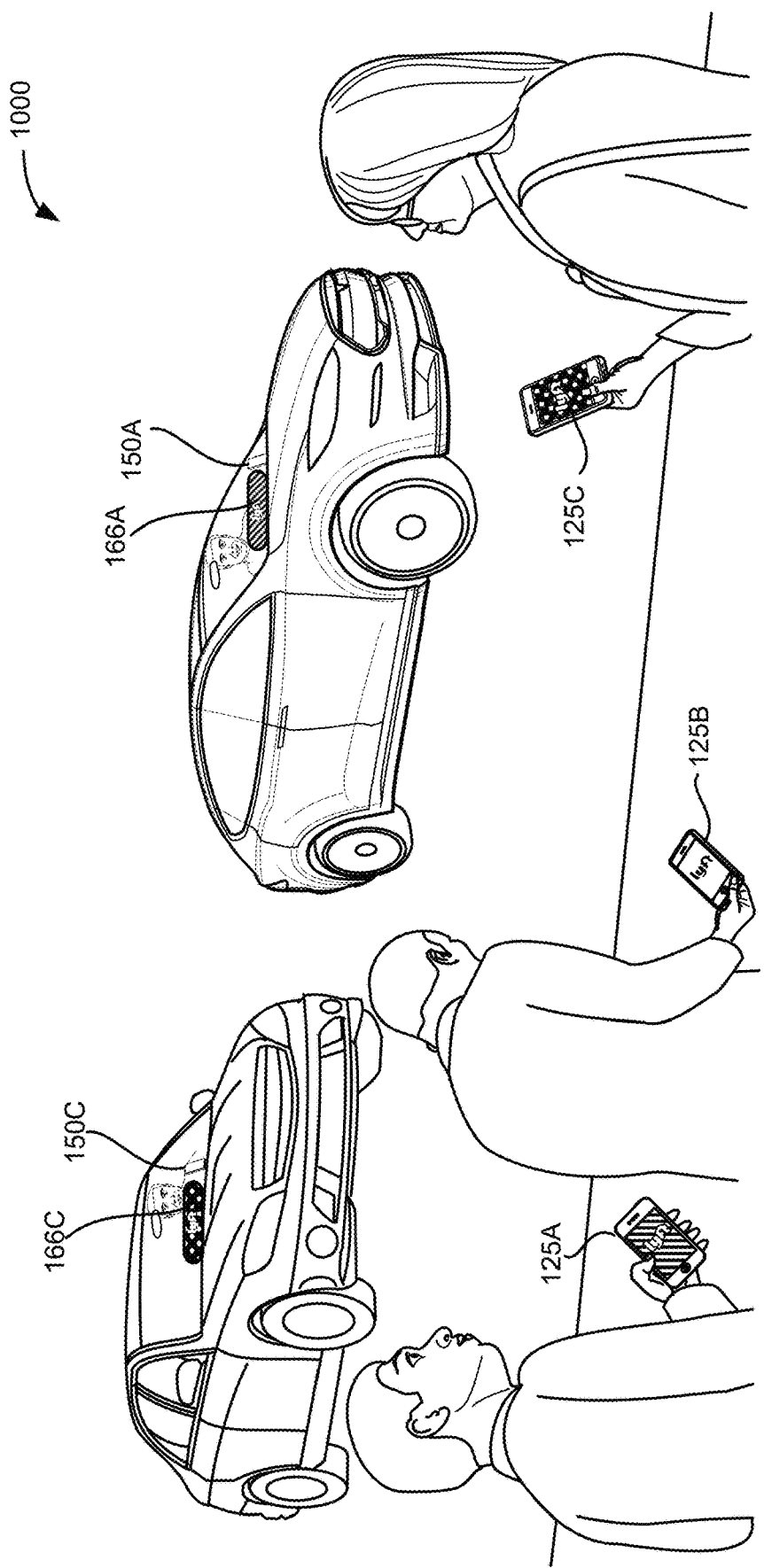
FIG. 10 illustrates an example of an environment including multiple requestors and multiple providers at a pick-up location, in accordance with an embodiment of the present techniques.

FIG. 10 illustrates an example of an environment including multiple requestors and multiple providers at a pick-up location showing the presentation of identification elements associated with the providers and the requestors, in accordance with an embodiment of the present techniques. For example, FIG. 10 shows an example street level view of a pick-up location associated with FIG. 9, where the three requestor computing devices 120A-C are awaiting their three matched providers 150A-C. Using the example provided in FIG. 9, the first matched provider 140A and the third matched provider 140C have arrived and are presenting the corresponding patterns 166A, 166C (e.g., "striped pattern" and "polka dot pattern") associated with their assigned identification elements (e.g., "002" and "001" respectively) through their corresponding provider communication devices 160A, 160C. The first and third requestor computing devices 120A, 120C are also presenting the graphics 128A, 128C (e.g., "striped pattern" and "polka dot pattern") corresponding to their assigned identification elements (e.g., "002" and "001", respectively) that were received with the match ride information. Thus, the first and third requestors can quickly and easily identify which provider is associated with each requestor. Further, the second requestor 110B quickly and easily identifies that their provider is not present because neither of the provider communication devices associated with the providers is displaying a graphic 128B matching their assigned identification element. As such, there is no confusion, delay, and/or missed rides or mismatches between providers and requestors.

Figure 11:
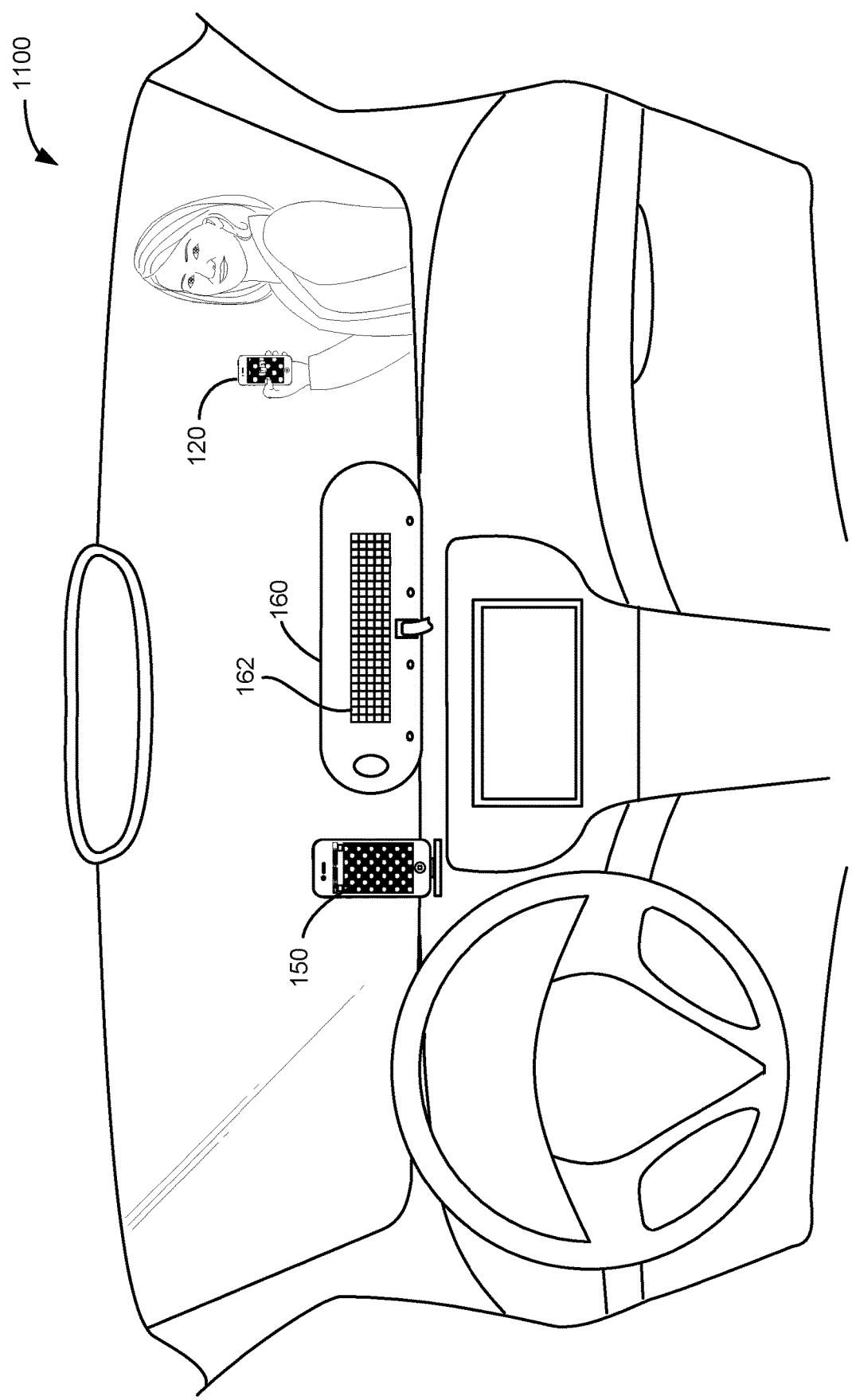
FIG. 11 illustrates an example of an environment from the view point of a provider at a pick-up location, in accordance with an embodiment of the present techniques.

Moreover, the first and third provider can easily tell which requestor is associated with their ride because they can ask a requestor that approaches their vehicle to show them their requestor computing device 120. FIG. 11 illustrates an example of an environment from the view point of a provider at a pick-up location where the requestor is displaying a requestor computing device 120, where the requestor computing device 120 is presenting a graphic associated with an identification element so that the provider can validate that the requestor is matched correctly. As shown in FIG. 11, the provider can quickly and easily validate that the requestor is correctly matched by comparing the graphic (i.e., pattern, color, etc.) displayed on the requestor computing device 120 to the graphic displayed on the provider computing device 150. Thus, in some embodiments, the provider computing device causes graphic associated with the identification element to be presented on the display of the provider computing device 150 and the provider communication device 160.

Additionally, in some embodiments, the graphics associated with the identification element may be presented on the rear display 162 of the provider communication device 160 which leaves the display of the provider computing device 150 free to have other applications displayed or other important information displayed to the provider that is driving the vehicle. As is explained in further detail in reference to FIG. 13 below, in some embodiments, the graphics associated with the identification element may be triggered to be presented upon arrival by the provider computing device 150 at or near the request location. For example, in some embodiments, upon arrival at a request location, the provider may press an arrived button or other input on the provider application 151 of the provider computing device 150, and the provider application 151 may send a message to the ride matching system 130 that the provider has arrived. When the arrival input is received by the provider application 151 of the provider computing device 150, the interactive display module may cause the graphics associated with the identification element to be displayed on the displays of the provider computing device 150 and the provider communication device 160. The ride matching system may issue a provider arrival message to the requestor computing device 120 and the interactive display module 122 of the requestor application 121 may trigger the graphics to be presented on the display of the requestor computing device 120. In some embodiments, no arrival input by the provider may be required and instead, the provider application 151 and the requestor application 121 may trigger presentation of the graphics associated with the identification element based on the location of the respective provider computing device 150 and/or the requestor computing device 120.

Figure 12:
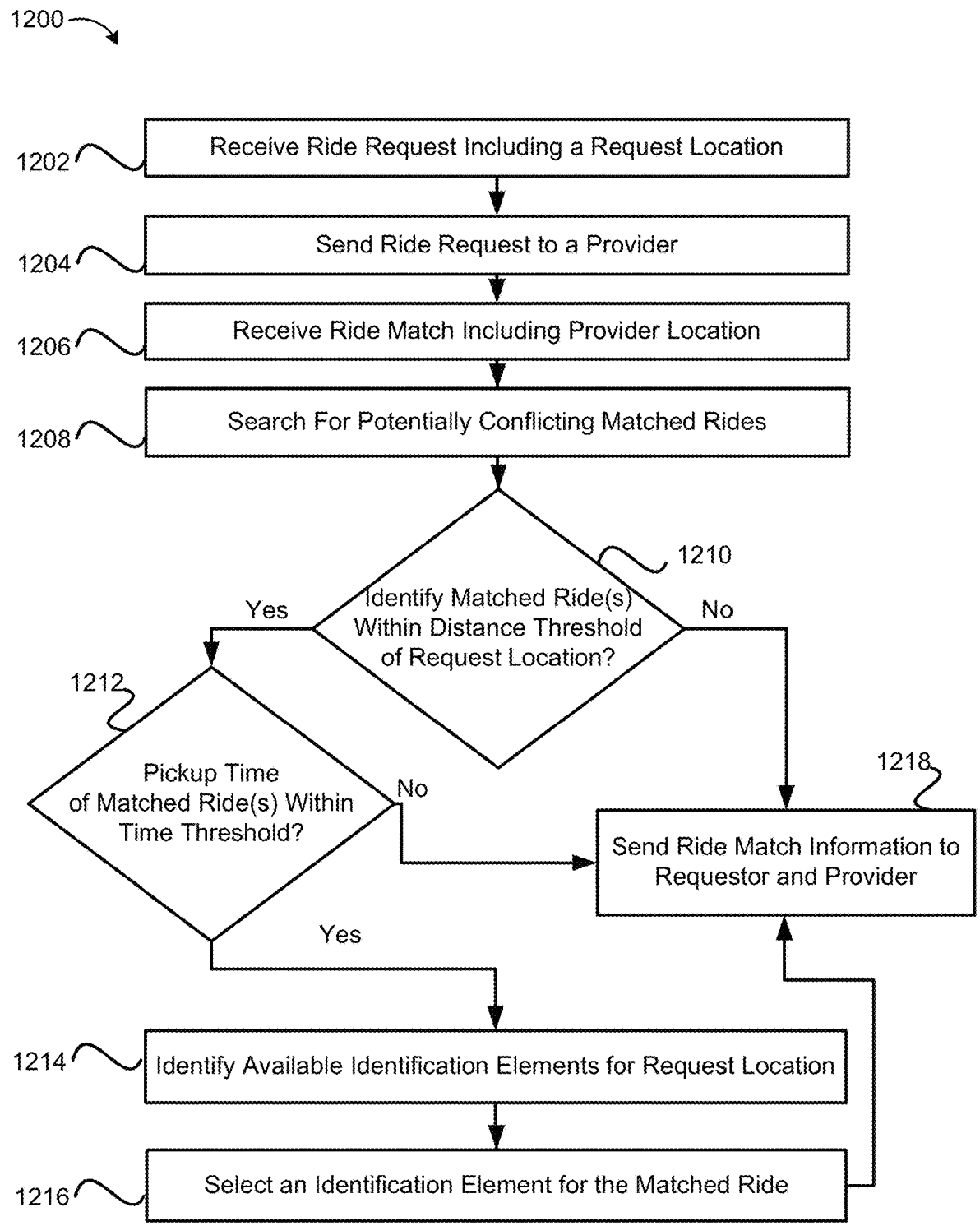
FIG. 12 illustrates an exemplary flow diagram of a method for identifying matched providers and requestors at a pick-up location, in accordance with embodiments of the present techniques.

FIG. 12 illustrates an exemplary flow diagram 1200 of a method for identifying matched providers and requestors at a pick-up location, in accordance with embodiments of the present techniques. At step 1202, the ride matching system receives a ride request from a requestor computing device. The ride request may include a request location (i.e., pick-up location), a requestor identifier, a request location, and/or any other relevant information associated with the ride request and/or requestor.

At step 1204, the ride matching system may identify a provider computing device associated with an available provider that is near the request location and may send the ride request to the provider computing device. The ride request may include the request location, requestor information, and/or any other relevant information to allow the provider to identify whether they want to accept or decline the ride request. The ride matching system may identify the provider by determining what provider is closest to the request location, has the highest likelihood of accepting the ride request, and/or through any other suitable method.

At step 1206, the ride matching system receives a ride match from the provider computing device indicating that the provider has accepted the ride request. In some embodiments, the ride match may include the request location and a provider location associated with the provider computing device. Alternatively and/or additionally, the ride matching system may identify the request location and the provider location associated with the ride matching system by searching one or more data stores of provider and/or requestor information for the request location and/or provider location associated with the matched ride.

At step 1208, the ride matching system searches for potentially conflicting matched rides to the current matched ride. For example, the ride matching system may search for matched rides that have request locations within a distance threshold from the request location of the current ride match. For instance, in some embodiments, the ride matching system may identify potential pick-up addresses within a distance threshold of the request location and search for potentially conflicting matched rides that match any of those addresses. In some embodiments, the distance threshold may be dependent on the request location, the provider settings and/or historical behavior, the requestor settings and/or historical behavior, the time of day, the day of the week, the existence of a holiday, and/or any other suitable information to tailor the search to potentially conflicting rides based on the circumstances of the matched ride.

At step 1210, the ride matching system identifies whether a previously matched ride having a previously matched request location is within a distance threshold from the request location. If a previously matched ride having a previously matched request location within the distance threshold from the request location is identified, a potentially conflicting ride is identified.

At step 1212, if a potentially conflicting ride is identified, the ride matching system determines whether the pick-up time of the potentially conflicting ride is within a time threshold of the estimated arrival time for the provider of the matched ride. In order to identify whether the pick-up time of the potentially conflicting rides is within the time threshold, the ride matching system determines an estimated arrival time for the matched ride and for the potentially conflicting rides. The ride matching system may determine a provider estimated arrival time for the provider to the request location of the matched ride by mapping a route to the request location from the provider location and incorporating traffic, weather, and/or any other information that may impact the travel time for the provider to the request location. The ride matching system may identify a matched ride estimated arrival time for the previously matched ride by performing a similar determination based on the location of the provider and the request location for that previously matched ride and/or by obtaining a previously calculated arrival time from ride matching information stored with the previously matched ride. The ride matching system may compare the distance between the arrival times of the potentially conflicting ride and the matched ride to a time threshold to identify whether a real conflict is present.

At step 1214, if one or more real conflicts are present based on both geographic and time conflicts with other matched rides, the ride matching system may identify available identification elements for the request location. The ride matching system may identify available identification elements by obtaining previously assigned identification elements associated with each of the previously matched conflicting rides and comparing the previously assigned identification elements to a list of identification elements for the ride matching system.

At step 1216, the ride matching system selects one of the available identification elements and assigns the identification element to the matched ride. The ride matching system may select the available identification element based on the highest ranked available identification element, randomly, and/or through any other suitable process.

At step 1218, the ride matching system provides the assigned identification element to the requestor computing device and the provider computing device for presentation to the corresponding requestor and/or provider upon arrival by the provider. As described above, in some embodiments, the timing of the presentation of the identification element may be dependent upon a signal from the ride matching system and/or may be based upon geographic locations identifying that a provider has arrived at a request location.

Figure 13:
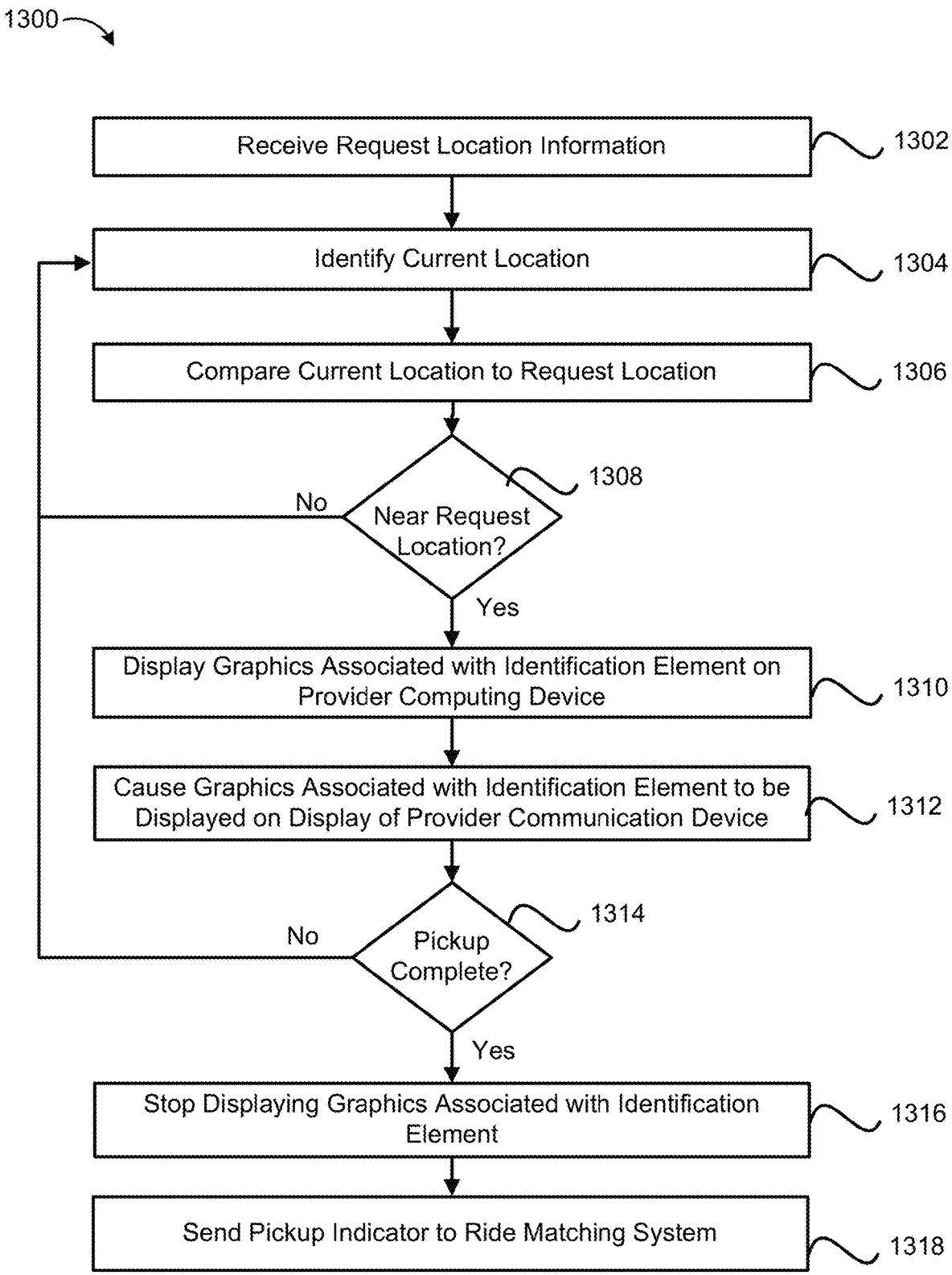
FIG. 13 illustrates an exemplary flow diagram of a method for presenting graphics associated with an identification element, in accordance with an embodiment of the present techniques.

FIG. 13 illustrates an exemplary flow diagram 1300 of a method for presenting graphics associated with an identification element, in accordance with an embodiment of the present techniques. FIG. 13 shows one example process for identifying when a graphic associated with an assigned identification element may be presented on a display of a requestor computing device, a display of a provider computing device, and/or a display of a provider communication device. For example, in some embodiments, the identification element may not be displayed until a provider has arrived at a request location and is ready to provide a service to the requestor. Thus, although the requestor computing device and the provider computing device may have the assigned identification element prepared and ready to be displayed upon matching, the requestor computing device and the provider computing device may not present the identification element until arrival to ensure there is no misunderstanding with other requestors/providers, to avoid distracting the requestor and/or provider when the identification element is not necessary, and to conserve resources by only presenting the graphics associated with the identification element when the respective parties are in a position to the use the information to validate the authenticity of the opposing matched party. Note that FIG. 13 describes the process from the point of view of a provider computing device but the process may be applied equally to a requestor computing device.

At step 1302, the provider computing device receives the request location associated with a match ride. The provider computing device identifies their current location (step 1304) using GPS components and/or other location service components and compares the provider computing device's location to the request location to identify a distance to the request location (step 1306).

At step 1308, the provider computing device identifies whether the provider computing device is near the request location by comparing the distance to the request location against a pick-up distance threshold. The pick-up distance threshold may be preconfigured based on the geographic area of the pick-up location and may be different or the same as the distance threshold used to identify potentially conflicting matched rides. If the provider computing device is not near the request location, the process may return to step 1302, obtain new location information for the provider computing device and continue comparing the locations until the provider computing device is within the pick-up distance threshold to the request location.

At step 1310, the provider computing device determines that it is near the request location and presents graphics associated with assigned identification element on a display of the provider computing device. The provider computing device also sends an instruction to the provider communication device to start presenting (step 1312) the graphics associated with the identification element and the provider communication device displays the graphics associated with the assigned identification element on a display of the provider communication device. In some embodiments, the process may be altered to identify whether the request location is in front or behind the provider computing device and/or provider communication device and may send a signal indicating which display of the provider communication device in which to display the graphics associated with the assigned identification element. For example, if the provider computing device identifies that the distance is getting larger and/or that the direction to the request location changes 180 degrees, then an instruction may be delivered to display the graphics on the rear display of the provider communication device so that a requestor looking at the vehicle from behind may be able to see the graphics associated with the identification element.

At step 1314, the provider computing device may determine whether a pick-up has been completed such that either the provider provides an input indicating that the pick-up is complete and successful, the ride has been canceled, and/or once the locations of the provider computing device and the requestor computing device are in such short proximity that the requestor is present in the vehicle. The graphics associated with the identification element may be presented until a pick-up indicator has been received and/or until the provider application identifies that a pick-up has been completed.

At step 1316, the provider computing device determines that the pick-up is completed and stops presenting the graphics associated with the identification element. Additionally, a pick-up indicator is sent (step 1318) to the ride matching system which passes the pick-up complete indicator to the requestor computing device. The requestor computing device may stop presenting the graphics associated with the identification element once the pick-up indicator is received and the ride is completed. The ride matching system may update the respective data stores with the completed ride information and the accounts for the requestor and the provider may be updated according to the ride information that was tracked during the matched ride.

Figure 14:
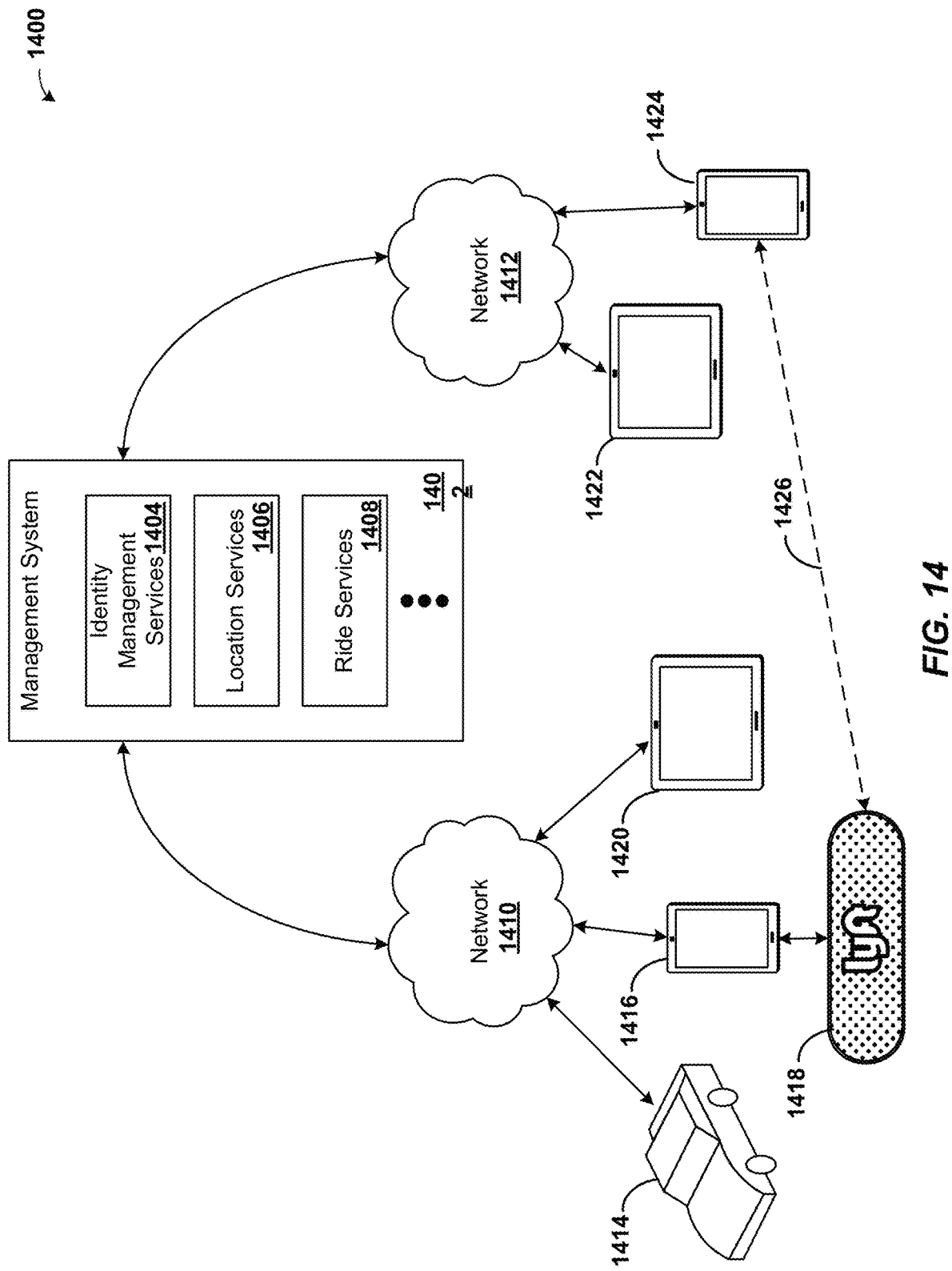
FIG. 14 illustrates an example requestor/provider management environment, in accordance with various embodiments.

FIG. 14 shows a requestor/provider management environment 1400, in accordance with various embodiments. As shown in FIG. 14, a management system 1402 can be configured to provide various services to requestor and provider devices. Management system 1402 can run one or more services or software applications, including identity management services 1404, location services 1406, ride services 1408, or other services. Although three services are shown as being provided by management system 1402, more or fewer services may be provided in various implementations. In various embodiments, management system 1402 may include one or more general purpose computers, server computers, clustered computing systems, cloud-based computing systems, or any other computing systems or arrangements of computing systems. Management system 1402 may be configured to run any or all of the services and/or software applications described with respect to various embodiments of the present techniques described herein. In some embodiments, management system 1402 can run any appropriate operating system as well as various server applications, such as common gateway interface (CGI) servers, JAVA® servers, hypertext transport protocol (HTTP) servers, file transfer protocol (FTP) servers, database servers, etc.

For example, identity management services 1404 may include various identity services, such as access management and authorization services for requestors and providers when interacting with management system 1402. This may include, e.g., authenticating the identity of providers and determining that the providers are authorized to provide services through management system 1402. Similarly, requestors' identities may be authenticated to determine whether the requestor is authorized to receive the requested services through management system 1402. Identity management services 1404 may also control access to provider and requestor data maintained by management system 1402, such as driving and/or ride histories, personal data, or other user data. Location services 1406 may include navigation and/or traffic management services and user interfaces, or other location services.

In various embodiments, ride services 1408 may include ride matching and management services to connect a requestor to a provider. Ride services 1408 may include a user interface and or may receive data from requestors and providers through applications executing on their respective devices. Ride services 1408 may, e.g., confirm the identity of requestors and providers using identity management services 1404, and determine that each user is authorized for the requested ride service. In some embodiments, ride services 1408 can identify an appropriate provider using a location obtained from a requestor and location services 1406 to identify, e.g., a closest provider. As such, ride services 1408 can manage the distribution and allocation of provider and requestor resources, consistent with embodiments described herein.

Management system 1402 can connect to various devices through network 1410 and 1412. Networks 1410, 1412 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1410, 1412 can include local area networks (LAN), such as Ethernet, Token-Ring or other LANs. Networks 1410, 1412 can include a wide-area network and/or the Internet. In some embodiments, networks 1410, 1412 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1410, 1412 can include a mobile network, such as a mobile telephone network, cellular network, satellite network, or other mobile network. Networks 1410, 1412 may be the same as communication network 170 in FIG. 1. In some embodiments, networks 1410, 1412 may each include a combination of networks described herein or other networks as are known to one of ordinary skill in the art.

Users may then utilize one or more services provided by management system 1402 using applications executing on provider and requestor devices. As shown in FIG. 14, provider computing devices 1414, 1416, 1418, and/or 1420 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1410, 1412. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1414 can include a vehicle-integrated computing device, such as a vehicle navigation system, or other computing device integrated with the vehicle itself.

In some embodiments, provider computing device 1418 can include a provider communication device configured to communicate with users, such as drivers, passengers, pedestrians, and other users. In some embodiments, provider communication device 1418 can communicate directly with management system 1402 or through another provider computing device, such as provider computing device 1416. In some embodiments, a requestor computing device can communicate 1426 directly with provider communication device 1418 over a peer-to-peer connection, Bluetooth connection, NFC connection, ad hoc wireless network, or any other communication channel or connection. Although particular devices are shown as communicating with management system 1402 over networks 1410 and 1412, in various embodiments, management system 1402 can expose an interface, such as an application programming interface (API) or service provider interface (SPI) to enable various third parties which may serve as an intermediary between end users and management system 1402.

Although requestor/provider management environment 1400 is shown with four provider devices and two requestor devices, any number of devices may be supported. The various components shown and described herein may be implemented in hardware, firmware, software, or combinations thereof. Although one embodiment of a requestor/provider management environment is depicted in FIG. 14, this is merely one implementation and not meant to be limiting.

Figure 15:
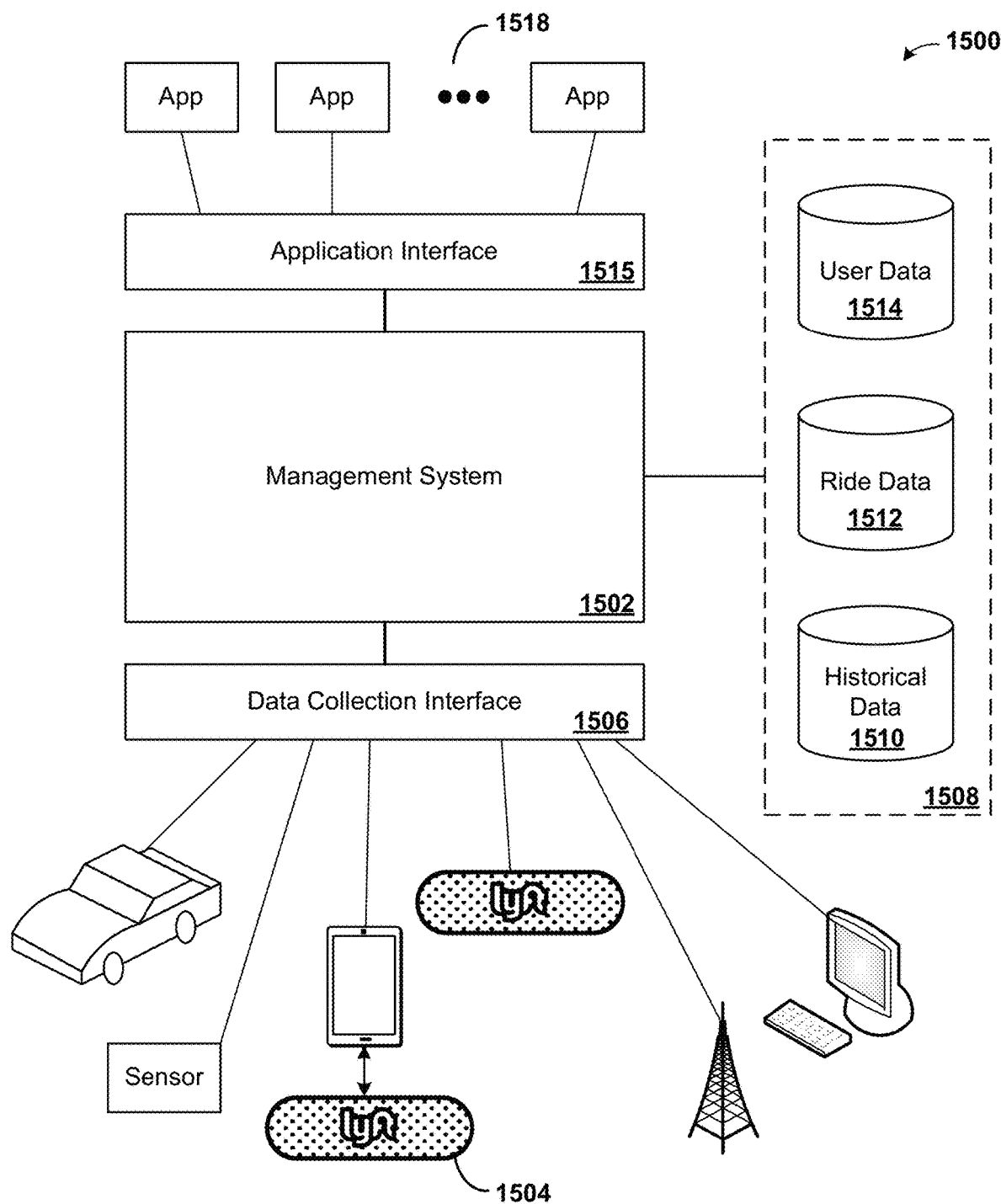
FIG. 15 illustrates an example data collection and application management system, in accordance with various embodiments.

FIG. 15 shows a data collection and application management environment 1500, in accordance with various embodiments. As shown in FIG. 15, management system 1502 may be configured to collect data from various data collection devices 1504 through a data collection interface 1506. As discussed above, management system 1502 may include one or more computers and/or servers or any combination thereof. Data collection devices 1504 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1506 can include, e.g., an extensible device framework configured to support interfaces for each data collection device. In various embodiments, data collection interface 1506 can be extended to support new data collection devices as they are released and/or to update existing interfaces to support changes to existing data collection devices. In various embodiments, data collection devices may communicate with data collection interface 1506 over one or more networks. The networks may include any network or communication protocol as would be recognized by one of ordinary skill in the art, including those networks discussed above.

As shown in FIG. 15, data received from data collection devices 1504 can be stored in data store 1508. Data store 1508 can include one or more data stores, such as databases, object storage systems and services, cloud-based storage services, and other data stores. For example, various data stores may be implemented on a non-transitory storage medium accessible to management system 1502, such as historical data store 1510, ride data store 1512, and user data store 1514. Data stores 1508 can be local to management system 1502, or remote and accessible over a network, such as those networks discussed above or a storage-area network or other networked storage system. In various embodiments, historical data 1510 may include historical traffic data, weather data, request data, road condition data, or any other data for a given region or regions received from various data collection devices. Ride data 1512 may include route data, request data, timing data, and other ride related data, in aggregate and/or by requestor or provider. User data 1514 may include user account data, preferences, location history, and other user-specific data. Although particular data stores are shown, any data collected and/or stored according to the various embodiments described herein may be stored in data stores 1508.

As shown in FIG. 15, an application interface 1516 can be provided by management system 1502 to enable various apps 1518 to access data and/or services available through management system 1502. Apps 1518 can run on various user devices (including provider and requestor computing devices, such as those discussed above) and/or may include cloud-based or other distributed apps configured to run across various devices (e.g., computers, servers, or combinations thereof). Apps 1518 may include, e.g., aggregation and/or reporting apps which may utilize data 1508 to provide various services (e.g., third-party ride request and management apps). In various embodiments, application interface 1516 can include an API and/or SPI enabling third party development of apps 1518. In some embodiments, application interface 1516 may include a web interface, enabling web-based access to data 1508 and/or services provided by management system 1502. In various embodiments, apps 1518 may run on devices configured to communicate with application interface 1516 over one or more networks. The networks may include any network or communication protocol as would be recognized by one of ordinary skill in the art, including those networks discussed above, in accordance with an embodiment of the present disclosure.

Although a particular implementation of environment 1500 is shown in FIG. 15, this is for illustration purposes only and not intended to be limited. In some embodiments, environment 1500 may include fewer or more components, as would be recognized by one or ordinary skill in the art.

FIGS. 16A-16C show an example provider communication device 1600 in accordance with various embodiments. As shown in FIG. 16A, a front view 1602 of provider communication device 1600 shows a front display 1604. In some embodiments, front display 1604 may include a secondary region or separate display 1606. As shown in FIG. 16A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1604 can be configured to show colors, patterns, color patterns, or other identifying information to requestors and other users external to a provider vehicle. In some embodiments, the secondary region or separate display 1606 may be configured to display the same, or contrasting, information as front display 1604.

As shown in FIG. 16B, a rear view 1608 of provider communication device 1600 shows a rear display 1610. Rear display 1610, as with front display 1604, rear display 1610 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1610 may be configured to provide information to users external to the provider vehicle who are located behind the provider vehicle. As further shown in FIG. 16B, provider communication device may include a power button 1612 or other switch which can be used to turn on or off the provider communication device. In various embodiments, power button 1612 may be a hardware button or switch that physically controls whether power is provided to provider communication device 1600. Alternatively, power button 1612 may be a soft button that initiates a startup/shutdown procedure managed by software and/or firmware instructions. In some embodiments, provider communication device 1600 may not include a power button 1612. Additionally, provider communication device may include one or more light features 1614 (such as one or more LEDs or other light sources) configured to illuminate areas adjacent to the provider communication device 1600. In some embodiments, provider communication device 1600 can include a connector to enable a provider computing device to be connected to the provider communication device 1600. In some embodiments, power may be provided to the provider communication device through connector 1616.

FIG. 16C shows a block diagram of provider computing device 1600. As shown in FIG. 16C, provider communication device can include a processor 1618. Processor 1618 can control information displayed on rear display 1610 and front display 1604. As noted, each display can display information to different users, depending on the positioning of the users and the provider communication device. In some embodiments, display data 1620 can include stored display patterns, sequences, colors, text, or other data to be displayed on the front and/or rear display. In some embodiments, display data 1620 can be a buffer, storing display data as it is received from a connected provider computing device. In some embodiments, display data 1620 can include a hard disk drive, solid state drive, memory, or other storage device including information from a management system. In some embodiments, lighting controller 1622 can manage the colors and/or other lighting displayed by light features 1614. In some embodiments, communication component 1624 can manage networking or other communication between the provider communication device 1600 and one or more networking components or other computing devices. In various embodiments, communication component 1624 can be configured to communicate over Wi-Fi, Bluetooth, NFC, RF, or any other wired or wireless communication network or protocol. In some embodiments, provider communication device 1600 can include an input/output system 1626 configured to provide output in addition to that provided through the displays and/or to receive inputs from users. For example, I/O system 1626 can include an image capture device configured to recognize motion or gesture-based inputs from a user. Additionally, or alternatively, I/O system 1626 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 17:
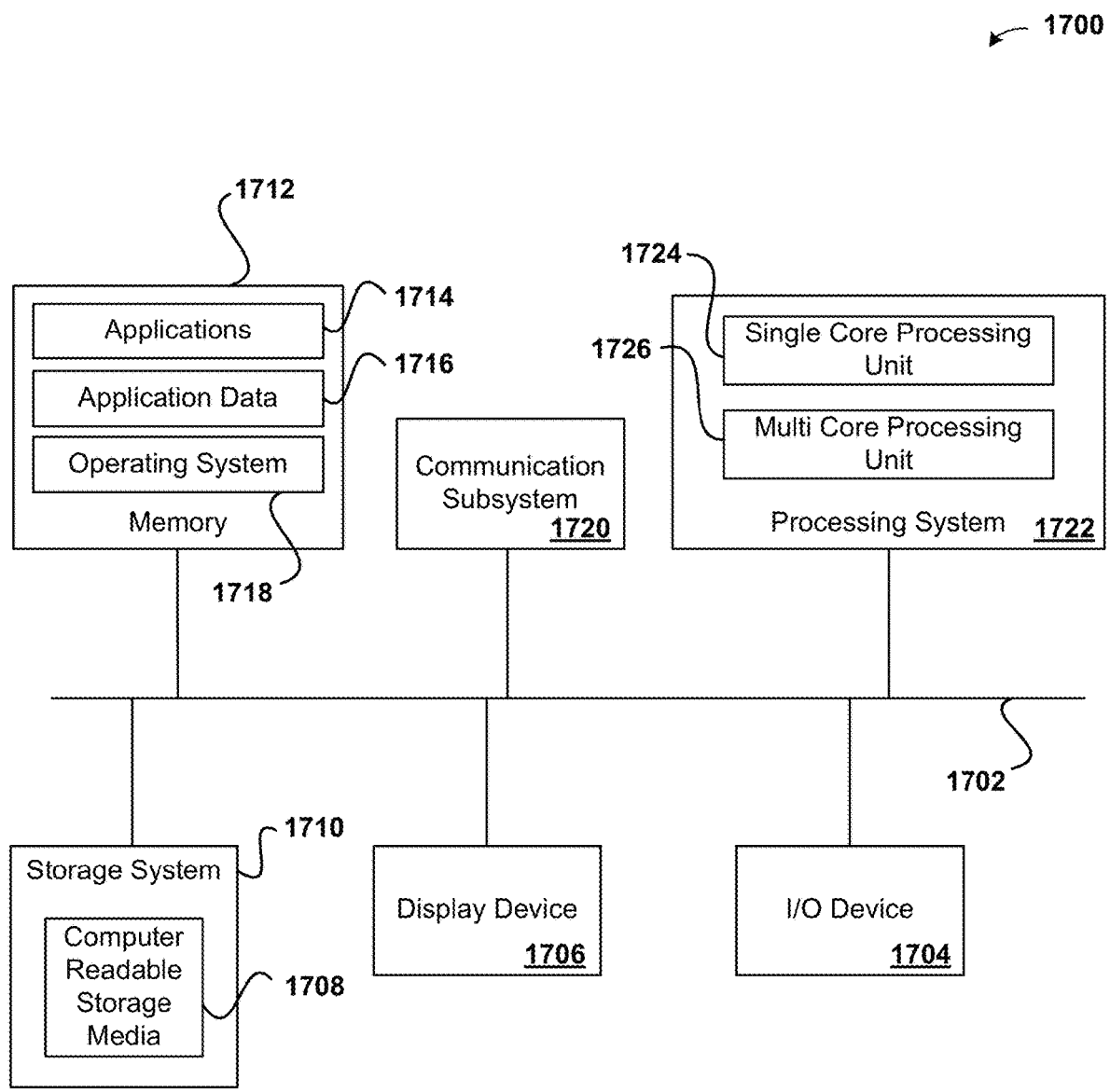
FIG. 17 illustrates an example computer system, in accordance with various embodiments.

FIG. 17 shows an example computer system 1700, in accordance with various embodiments. In various embodiments, computer system 1700 may be used to implement any of the systems, devices, or methods described herein. In some embodiments, computer system 1700 may correspond to any of the various devices described herein, including, but not limited, to mobile devices, tablet computing devices, wearable devices, personal or laptop computers, vehicle-based computing devices, or other devices or systems described herein. As shown in FIG. 17, computer system 1700 can include various subsystems connected by a bus 1702. The subsystems may include an I/O device subsystem 1704, a display device subsystem 1706, and a storage subsystem 1710 including one or more computer readable storage media 1708. The subsystems may also include a memory subsystem 1712, a communication subsystem 1720, and a processing subsystem 1722.

In system 1700, bus 1702 facilitates communication between the various subsystems. Although a single bus 1702 is shown, alternative bus configurations may also be used. Bus 1702 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1702 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1704 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1704 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1700 may include a display device subsystem 1706. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1706 may include a controller and/or interface for controlling and/or communicating with an external display, such as any of the above-mentioned display technologies.

As shown in FIG. 17, system 1700 may include storage subsystem 1710 including various computer readable storage media 1708, such as hard disk drives, solid state drives (including RAM-based and/or flash-based SSDs), or other storage devices. In various embodiments, computer readable storage media 1708 can be configured to store software, including programs, code, or other instructions, that is executable by a processor to provide functionality described herein. In some embodiments, storage system 1710 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1710 can include a media reader, card reader, or other storage interface to communicate with one or more external and/or removable storage devices. In various embodiments, computer readable storage media 1708 can include any appropriate storage medium or combination of storage media. For example, computer readable storage media 1708 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1712 can include various types of memory, including RAM, ROM, flash memory, or other memory. Memory 1712 can include SRAM (static RAM) or DRAM (dynamic RAM). In some embodiments, memory 1712 can include a BIOS (basic input/output system) or other firmware configured to manage initialization of various components during, e.g., startup. As shown in FIG. 17, memory 1712 can include applications 1714 and application data 1716. Applications 1714 may include programs, code, or other instructions, that can be executed by a processor. Applications 1714 can include various applications such as browser clients, location management applications, ride management applications, data management applications, and any other application. Application data 1716 can include any data produced and/or consumed by applications 1714. Memory 1712 can additionally include operating system 1718, such as macOS®, Windows®, Linux®, various UNIX® or UNIX- or Linux-based operating systems, or other operating systems.

System 1700 can also include a communication subsystem 1720 configured to facilitate communication between system 1700 and various external computer systems and/or networks (such as the Internet, a local area network (LAN), a wide area network (WAN), a mobile network, or any other network). Communication subsystem 1720 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 170 in FIG. 1. Additionally, or alternatively, communication subsystem 1720 can include hardware and/or software components to communicate with satellite-based or ground-based location services, such as GPS (global positioning system). In some embodiments, communication subsystem 1720 may include, or interface with, various hardware or software sensors. The sensors may be configured to provide continuous or and/or periodic data or data streams to a computer system through communication subsystem 1720

As shown in FIG. 17, processing system 1722 can include one or more processors or other devices operable to control computing system 1700. Such processors can include single core processors 1724, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1722, such as processors 1724 and 1726, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    receiving a transportation request from a requestor computing device to transport a requestor from a pick-up location to a destination location, wherein the requestor computing device requests ridesharing services;
    sending, via a first communication protocol, the transportation request to a provider computing device within a vehicle, wherein the provider computing device is paired by a second communication protocol comprising a wireless short-range communication protocol with a provider communication device that is also within the vehicle and wherein the provider computing device accepts ridesharing requests;
    identifying, from among available identification elements, an identification element for the requestor based on a selection by the requestor computing device that requests the ridesharing services, a visual indicator corresponding to the identification element and receiving an indication from the provider computing device that a provider associated with the paired provider communication device accepts the transportation request;
    sending, via the first communication protocol, the identification element to the provider computing device to:
    cause the provider computing device to present a first graphic comprising the visual indicator corresponding to the identification element; and
    communicate via the second communication protocol with the paired provider communication device to cause the paired provider communication device to present:
        on a front display as part of the first graphic, the visual indicator corresponding to the identification element; and
        on a rear display as part of a second graphic differing from the first graphic, instructions corresponding to the transportation request; and
    sending the identification element to the requestor computing device as part of a ride match response to cause the requestor computing device to present, within a graphical user interface, the visual indicator from the first graphic and corresponding to the identification element.

2. The method of claim 1, wherein:
    sending the transportation request via the first communication protocol comprises utilizing a network communication protocol to send the transportation request; and the second communication protocol comprises a Bluetooth protocol to pair the provider computing device with the provider communication device.

3. The method of claim 1, wherein identifying, from among the available identification elements, the identification element further comprises:
  determining a weather condition corresponding to the pick-up location; and
  based on the weather condition, filtering the available identification elements to a subset of identification elements for the requestor computing device.

4. The method of claim 1, wherein identifying, from among the available identification elements, the identification element further comprises:
  determining an indication of visual impairment corresponding to the transportation request from the requestor computing device; and
  based on the indication of visual impairment, filtering the available identification elements to a subset of identification elements that conform with visual impairment requirements for the requestor computing device.

5. The method of claim 1, wherein causing the paired provider communication device to present, on the rear display as part of the second graphic, the instructions corresponding to the transportation request comprises causing the paired provider communication device to present directions for the requestor within a transportation vehicle concerning a requested transport.

6. The method of claim 1, further comprising sending the identification element to an additional computing device located within a transportation vehicle corresponding to the provider computing device to cause the additional computing device to display, within a graphical user interface of the additional computing device, the visual indicator from the first graphic and corresponding to the identification element.

7. The method of claim 1, further comprising:
  determining an update to the transportation request from the requestor computing device; and
  based on the update, identifying a subset of the available identification elements to provide to the requestor computing device for the requestor computing device to select a new identification element to replace the identification element.

8. A system comprising:
  at least one processor; and
  at least one non-transitory computer readable storage medium storing instructions that, when executed by the at least one processor, cause the system to:
  receive a transportation request from a requestor computing device to transport a requestor from a pick-up location to a destination location, wherein the requestor computing device requests ridesharing services;
  send, via a first communication protocol, the transportation request to a provider computing device within a vehicle, wherein the provider computing device is paired by a second communication protocol comprising a wireless short-range communication protocol with a provider communication device that is also within the vehicle and wherein the provider computing device accepts ridesharing requests;
  identify, from among available identification elements, an identification element for the requestor based on a selection by the requestor computing device that requests the ridesharing services, a visual indicator corresponding to the identification element and receiving an indication from the provider computing device that a provider associated with the paired provider communication device accepts the transportation request;
  send, via the first communication protocol, the identification element to the provider computing device to:
  cause the provider computing device to present a first graphic comprising the visual indicator corresponding to the identification element; and
  communicate via the second communication protocol with the paired provider communication device to cause the paired provider communication device to present:
    on a front display as part of the first graphic, the visual indicator corresponding to the identification element; and
    on a rear display as part of a second graphic differing from the first graphic, instructions corresponding to the transportation request; and
  send the identification element to the requestor computing device as part of a ride match response to cause the requestor computing device to present, within a graphical user interface, the visual indicator from the first graphic and corresponding to the identification element.

9. The system of claim 8, further comprising instructions that, when executed by the at least one processor cause the system to:
  utilize a network communication protocol as the first communication protocol to send the transportation request; and
  utilize a Bluetooth protocol as the second communication protocol to pair the provider computing device with the provider communication device.

10. The system of claim 8, further comprising instructions that, when executed by the at least one processor cause the system to:
  determine a weather condition corresponding to the pick-up location; and
  based on the weather condition, filter the available identification elements to a subset of identification elements for the requestor computing device.

11. The system of claim 8, further comprising instructions that, when executed by the at least one processor, cause the system to:
  determine an indication of visual impairment from a user corresponding to the transportation request from the requestor computing device; and
  based on the indication of visual impairment, filter the available identification elements to a subset of identification elements that conform with visual impairment requirements for the requestor computing device to select from.

12. The system of claim 8, further comprising instructions that, when executed by the at least one processor, cause the paired provider communication device to present, as part of the second graphic, the instructions corresponding to the transportation request by causing the paired provider communication device to present directions for the requestor within a transportation vehicle concerning a requested transport.

13. The system of claim 8, further comprising instructions that, when executed by the at least one processor, cause the system to send the identification element to an additional computing device located within a transportation vehicle corresponding to the provider computing device to cause the additional computing device to display, within a graphical user interface of the additional computing device, the visual indicator from the first graphic and corresponding to the identification element.

14. The system of claim 8, further comprising instructions that, when executed by the at least one processor, cause the system to:
  determining an update to the transportation request from the requestor computing device; and
  based on the update, identifying a subset of the available identification elements to provide to the requestor computing device for the requestor computing device to select a new identification element to replace the identification element.

15. A non-transitory computer readable medium storing instructions thereon that, when executed by at least one processor, cause a system to:
  receive a transportation request from a requestor computing device to transport a requestor from a pick-up location to a destination location, wherein the requestor computing device requests ridesharing services;
  send, via a first communication protocol, the transportation request to a provider computing device within a vehicle, wherein the provider computing device is paired by a second communication protocol comprising a wireless short-range communication protocol with a provider communication device that is also within the vehicle and wherein the provider computing device accepts ridesharing requests;
  identify, from among available identification elements, an identification element for the requestor based on a selection by the requestor computing device that requests the ridesharing services, a visual indicator corresponding to the identification element and receiving an indication from the provider computing device that a provider associated with the paired provider communication device accepts the transportation request;
  send, via the first communication protocol, the identification element to the provider computing device to:
    cause the provider computing device to present a first graphic comprising the visual indicator corresponding to the identification element; and
    communicate via the second communication protocol with the paired provider communication device to cause the paired provider communication device to present:
      on a front display as part of the first graphic, the visual indicator corresponding to the identification element; and
      on a rear display as part of a second graphic differing from the first graphic, instructions corresponding to the transportation request; and
  send the identification element to the requestor computing device as part of a ride match response to cause the requestor computing device to present, within a graphical user interface, the visual indicator from the first graphic and corresponding to the identification element.

16. The non-transitory computer readable medium of claim 15, further comprising instructions that, when executed by the at least one processor, cause the system to:
  utilize a network communication protocol as the first communication protocol to send the transportation request; and
  utilize a Bluetooth protocol as the second communication protocol to pair the provider computing device with the provider communication device.

17. The non-transitory computer readable medium of claim 15, further comprising instructions that, when executed by the at least one processor, cause the system to:
  determine a weather condition corresponding to the pick-up location; and
  based on the weather condition, filter the available identification elements to a subset of identification elements for the requestor computing device.

18. The non-transitory computer readable medium of claim 15, further comprising instructions that, when executed by the at least one processor, cause the system to:
  determine an indication of visual impairment corresponding to the transportation request from the requestor computing device; and
  based on the indication of visual impairment, filter the available identification elements to a subset of identification elements that conform with visual impairment requirements for the requestor computing device.

19. The non-transitory computer readable medium of claim 15, further comprising instructions that, when executed by the at least one processor, cause the paired provider communication device to present, as part of the second graphic, the instructions corresponding to the transportation request by causing the paired provider communication device to present directions for the requestor within a transportation vehicle concerning a requested transport.

20. The non-transitory computer readable medium of claim 15, further comprising instructions that, when executed by the at least one processor, cause the system to send the identification element to an additional computing device located within a transportation vehicle corresponding to the provider computing device to cause the additional computing device to display, within a graphical user interface of the additional computing device, the visual indicator from the first graphic and corresponding to the identification element.

* * * * *